United States Patent
Winograd et al.

(10) Patent No.: US 9,854,332 B2
(45) Date of Patent: *Dec. 26, 2017

(54) INTERACTIVE CONTENT ACQUISITION USING EMBEDDED CODES

(71) Applicant: Verance Corporation, San Diego, CA (US)

(72) Inventors: Joseph M. Winograd, San Diego, CA (US); Jian Zhao, San Diego, CA (US); Rade Petrovic, San Diego, CA (US)

(73) Assignee: Verance Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,714

(22) Filed: Jun. 6, 2017

(65) Prior Publication Data

US 2017/0280205 A1 Sep. 28, 2017

Related U.S. Application Data

(63) Continuation of application No. 15/139,063, filed on Apr. 26, 2016, now Pat. No. 9,681,203, which is a
(Continued)

(51) Int. Cl.
*H04N 5/445* (2011.01)
*H04N 21/8358* (2011.01)
(Continued)

(52) U.S. Cl.
CPC ......... *H04N 21/8358* (2013.01); *G06F 21/10* (2013.01); *H04N 21/2265* (2013.01);
(Continued)

(58) Field of Classification Search
CPC ..... H04N 21/44204; H04N 21/442008; H04N 21/437
(Continued)

(56) References Cited

U.S. PATENT DOCUMENTS 6,122,610 A 9/2000 Isabelle
6,145,081 A 11/2000 Winograd et al.
(Continued)

FOREIGN PATENT DOCUMENTS

EP 1474924 11/2004
EP 2439735 4/2012
(Continued)

OTHER PUBLICATIONS

"ATSC-3.0 Automatic Content Recognition Watermarking Solutions," ATSC Technology Group, Advanced Television Systems Committee, Inc., Jan. 2014 (6 pages).
(Continued)

*Primary Examiner* — Pankaj Kumar
*Assistant Examiner* — Sahar Baig
(74) *Attorney, Agent, or Firm* — Perkins Coie LLP; Donald L. Wenskay

(57) ABSTRACT

Methods and devices are provided to facilitate acquisition of information associated with a multimedia content through embedded watermarks. One such method includes obtaining a server code for embedding into a content. The server code identifies a particular domain name registered to a registrant entity and provides a mapping to an Internet address of a metadata server. Upon receiving an indication that a trigger event is associated with a particular segment of the content, a first watermark payload is formed and embedded in the content. The watermark payload includes the server code, an interval code and a first trigger value. The interval code identifies the particular content segment and the first trigger value indicates that additional information associated with the particular segment is. Detection of the first trigger value from a subsequently distributed content enables a query to the metadata server for acquisition of metadata.

32 Claims, 12 Drawing Sheets

Related U.S. Application Data continuation of application No. 14/656,578, filed on Mar. 12, 2015, now Pat. No. 9,596,521.

(60) Provisional application No. 61/952,840, filed on Mar. 13, 2014, provisional application No. 61/953,668, filed on Mar. 14, 2014.

(51) Int. Cl.

| | | |
|---|---|---|
| *H04N 21/226* | (2011.01) | |
| *H04N 21/435* | (2011.01) | |
| *H04N 21/44* | (2011.01) | |
| *G06F 21/10* | (2013.01) | |
| *H04N 21/2668* | (2011.01) | |
| *H04N 21/442* | (2011.01) | |
| *H04N 21/437* | (2011.01) | |

(52) U.S. Cl.
CPC ....... *H04N 21/2668* (2013.01); *H04N 21/435* (2013.01); *H04N 21/437* (2013.01); *H04N 21/44008* (2013.01); *H04N 21/44204* (2013.01)

(58) Field of Classification Search
USPC .............................................. 725/48, 49, 51
See application file for complete search history.

(56) References Cited

U.S. PATENT DOCUMENTS

| | | |
|---|---|---|
| 6,175,627 B1 | 1/2001 | Petrovic et al. |
| 6,411,725 B1 | 6/2002 | Rhoads et al. |
| 6,427,012 B1 | 7/2002 | Petrovic |
| 6,430,301 B1 | 8/2002 | Petrovic |
| 6,490,579 B1 | 12/2002 | Gao et al. |
| 6,577,747 B1 | 6/2003 | Kalker et al. |
| 6,683,958 B2 | 1/2004 | Petrovic |
| 6,721,439 B1 | 4/2004 | Levy et al. |
| 6,792,542 B1 | 9/2004 | Lee et al. |
| 6,839,673 B1 | 1/2005 | Choi et al. |
| 6,888,943 B1 | 5/2005 | Lam et al. |
| 6,931,536 B2 | 8/2005 | Hollar |
| 7,024,018 B2 | 4/2006 | Petrovic |
| 7,140,043 B2 | 11/2006 | Choi et al. |
| 7,159,118 B2 | 1/2007 | Petrovic |
| 7,224,819 B2 | 5/2007 | Levy et al. |
| 7,343,397 B2 | 3/2008 | Kochanski |
| 7,460,667 B2 | 12/2008 | Lee et al. |
| 7,533,266 B2 | 5/2009 | Bruekers et al. |
| 7,548,565 B2 | 6/2009 | Sull et al. |
| 7,689,532 B1 | 3/2010 | Levy |
| 7,707,422 B2 | 4/2010 | Shin et al. |
| 7,774,834 B1 | 8/2010 | Chauhan et al. |
| 7,779,271 B2 | 8/2010 | Langelaar |
| 7,983,922 B2 | 7/2011 | Neusinger et al. |
| 7,986,806 B2 | 7/2011 | Rhoads |
| 7,991,995 B2 | 8/2011 | Rabin et al. |
| 8,005,258 B2 | 8/2011 | Petrovic et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,059,858 B2 | 11/2011 | Brundage et al. |
| 8,081,757 B2 | 12/2011 | Voessing et al. |
| 8,085,935 B2 | 12/2011 | Petrovic |
| 8,103,049 B2 | 1/2012 | Petrovic et al. |
| 8,138,930 B1 | 3/2012 | Heath |
| 8,151,113 B2 | 4/2012 | Rhoads |
| 8,181,262 B2 | 5/2012 | Cooper et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,259,873 B2 | 9/2012 | Baum et al. |
| 8,280,103 B2 | 10/2012 | Petrovic et al. |
| 8,301,893 B2 | 10/2012 | Brundage |
| 8,315,835 B2 | 11/2012 | Tian et al. |
| 8,321,679 B2 | 11/2012 | Petrovic et al. |
| 8,340,348 B2 | 12/2012 | Petrovic et al. |
| 8,346,532 B2 | 1/2013 | Chakra et al. |
| 8,346,567 B2 | 1/2013 | Petrovic et al. |
| 8,467,717 B2 | 6/2013 | Croy et al. |
| 8,479,225 B2 | 7/2013 | Covell et al. |
| 8,483,136 B2 * | 7/2013 | Yuk ................ H04W 72/0406 370/236 |
| 8,533,481 B2 | 9/2013 | Petrovic et al. |
| 8,538,066 B2 | 9/2013 | Petrovic et al. |
| 8,560,604 B2 | 10/2013 | Shribman et al. |
| 8,588,459 B2 | 11/2013 | Bloom et al. |
| 8,589,969 B2 | 11/2013 | Falcon |
| 8,601,504 B2 | 12/2013 | Stone et al. |
| 8,615,104 B2 | 12/2013 | Petrovic et al. |
| 8,666,528 B2 | 3/2014 | Harkness et al. |
| 8,682,026 B2 | 3/2014 | Petrovic et al. |
| 8,726,304 B2 | 5/2014 | Petrovic et al. |
| 8,745,403 B2 | 6/2014 | Petrovic |
| 8,768,714 B1 | 7/2014 | Blesser |
| 8,781,967 B2 | 7/2014 | Tehranchi et al. |
| 8,791,789 B2 | 7/2014 | Petrovic et al. |
| 8,806,517 B2 | 8/2014 | Petrovic et al. |
| 8,811,655 B2 | 8/2014 | Petrovic et al. |
| 8,825,518 B2 | 9/2014 | Levy |
| 8,838,977 B2 | 9/2014 | Winograd et al. |
| 8,838,978 B2 | 9/2014 | Winograd et al. |
| 8,869,222 B2 | 10/2014 | Winograd et al. |
| 8,898,720 B2 | 11/2014 | Eyer |
| 8,923,548 B2 | 12/2014 | Petrovic et al. |
| 8,959,202 B2 | 2/2015 | Haitsma et al. |
| 8,990,663 B2 * | 3/2015 | Liu ....................... H04L 1/0041 714/776 |
| 9,009,482 B2 | 4/2015 | Winograd |
| 9,042,598 B2 | 5/2015 | Ramaswamy et al. |
| 9,055,239 B2 | 6/2015 | Tehranchi et al. |
| 9,106,964 B2 | 8/2015 | Zhao |
| 9,117,270 B2 | 8/2015 | Wong et al. |
| 9,147,402 B2 | 9/2015 | Chen et al. |
| 9,277,183 B2 | 3/2016 | Eyer |
| 9,596,521 B2 | 3/2017 | Winograd et al. |
| 9,602,891 B2 | 3/2017 | Winograd et al. |
| 9,607,131 B2 | 3/2017 | Winograd et al. |
| 2002/0032864 A1 | 3/2002 | Rhoads et al. |
| 2002/0059622 A1 | 5/2002 | Grove et al. |
| 2002/0078233 A1 | 6/2002 | Biliris et al. |
| 2002/0138695 A1 | 9/2002 | Beardsley et al. |
| 2003/0012403 A1 | 1/2003 | Rhoads et al. |
| 2003/0084294 A1 | 5/2003 | Aoshima et al. |
| 2003/0193616 A1 | 10/2003 | Baker et al. |
| 2003/0228030 A1 | 12/2003 | Wendt |
| 2004/0039914 A1 | 2/2004 | Barr et al. |
| 2004/0098370 A1 | 5/2004 | Garland et al. |
| 2004/0101160 A1 | 5/2004 | Kunisa |
| 2004/0250080 A1 | 12/2004 | Levy et al. |
| 2005/0182792 A1 | 8/2005 | Israel et al. |
| 2006/0047704 A1 | 3/2006 | Gopalakrishnan |
| 2006/0053292 A1 | 3/2006 | Langelaar |
| 2006/0062426 A1 | 3/2006 | Levy et al. |
| 2006/0083242 A1 * | 4/2006 | Pulkkinen ......... H04L 29/12009 370/392 |
| 2006/0115108 A1 | 6/2006 | Rodriguez et al. |
| 2006/0239501 A1 | 10/2006 | Petrovic et al. |
| 2007/0003103 A1 | 1/2007 | Lemma et al. |
| 2007/0039018 A1 | 2/2007 | Saslow et al. |
| 2007/0071037 A1 | 3/2007 | Abraham et al. |
| 2007/0135084 A1 | 6/2007 | Ido et al. |
| 2007/0250560 A1 | 10/2007 | Wein et al. |
| 2008/0037825 A1 | 2/2008 | Lofgren et al. |
| 2008/0263612 A1 | 10/2008 | Cooper |
| 2008/0297654 A1 | 12/2008 | Verberkt et al. |
| 2008/0301304 A1 * | 12/2008 | Chitsaz ............... H04L 63/0245 709/228 |
| 2009/0060055 A1 | 3/2009 | Blanchard et al. |
| 2009/0089078 A1 | 4/2009 | Bursey |
| 2009/0158318 A1 | 6/2009 | Levy |
| 2009/0319639 A1 | 12/2009 | Gao et al. |
| 2010/0023489 A1 | 1/2010 | Miyata et al. |
| 2010/0054531 A1 | 3/2010 | Kogure et al. |

(56) References Cited

U.S. PATENT DOCUMENTS

| | | |
|---|---|---|
| 2010/0063978 A1 | 3/2010 | Lee et al. |
| 2010/0097494 A1 | 4/2010 | Gum et al. |
| 2010/0111355 A1 | 5/2010 | Petrovic et al. |
| 2010/0131461 A1 | 5/2010 | Prahlad et al. |
| 2010/0172540 A1 | 7/2010 | Davis et al. |
| 2010/0174608 A1 | 7/2010 | Harkness et al. |
| 2010/0281142 A1 | 11/2010 | Stoyanov |
| 2010/0325646 A1 | 12/2010 | Alhadeff et al. |
| 2011/0058188 A1 | 3/2011 | Guo et al. |
| 2011/0088075 A1 | 4/2011 | Eyer |
| 2011/0103444 A1 | 5/2011 | Baum et al. |
| 2011/0161086 A1* | 6/2011 | Rodriguez ............ G06T 1/0071 704/270 |
| 2011/0164784 A1 | 7/2011 | Grill et al. |
| 2011/0188700 A1 | 8/2011 | Kim et al. |
| 2011/0261667 A1 | 10/2011 | Ren et al. |
| 2011/0281574 A1 | 11/2011 | Patel et al. |
| 2011/0286625 A1 | 11/2011 | Petrovic et al. |
| 2011/0293090 A1 | 12/2011 | Ayaki et al. |
| 2011/0307545 A1 | 12/2011 | Bouazizi |
| 2011/0320627 A1 | 12/2011 | Landow et al. |
| 2012/0023595 A1 | 1/2012 | Speare et al. |
| 2012/0063635 A1 | 3/2012 | Matsushita et al. |
| 2012/0072731 A1 | 3/2012 | Winograd et al. |
| 2012/0102304 A1 | 4/2012 | Brave |
| 2012/0113230 A1 | 5/2012 | Jin |
| 2012/0117031 A1 | 5/2012 | Cha et al. |
| 2012/0122429 A1 | 5/2012 | Wood et al. |
| 2012/0129547 A1 | 5/2012 | Andrews, III et al. |
| 2012/0203556 A1 | 8/2012 | Villette et al. |
| 2012/0203734 A1 | 8/2012 | Spivack et al. |
| 2012/0216236 A1 | 8/2012 | Robinson et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300975 A1 | 11/2012 | Chalamala et al. |
| 2012/0304206 A1 | 11/2012 | Roberts et al. |
| 2012/0308071 A1 | 12/2012 | Ramsdell et al. |
| 2013/0007462 A1 | 1/2013 | Petrovic et al. |
| 2013/0024894 A1 | 1/2013 | Eyer |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0114848 A1 | 5/2013 | Petrovic et al. |
| 2013/0117571 A1 | 5/2013 | Petrovic et al. |
| 2013/0129303 A1 | 5/2013 | Lee et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0171926 A1 | 7/2013 | Distribeo |
| 2013/0188923 A1 | 7/2013 | Hartley et al. |
| 2013/0227293 A1 | 8/2013 | Leddy et al. |
| 2013/0271657 A1 | 10/2013 | Park et al. |
| 2014/0047475 A1 | 2/2014 | Oh et al. |
| 2014/0059116 A1 | 2/2014 | Oh et al. |
| 2014/0059591 A1 | 2/2014 | Terpstra et al. |
| 2014/0067950 A1 | 3/2014 | Winograd |
| 2014/0068686 A1 | 3/2014 | Oh et al. |
| 2014/0074855 A1 | 3/2014 | Zhao et al. |
| 2014/0075465 A1 | 3/2014 | Petrovic et al. |
| 2014/0075469 A1 | 3/2014 | Zhao |
| 2014/0114456 A1 | 4/2014 | Stavropoulos et al. |
| 2014/0115644 A1* | 4/2014 | Kim ................... H04L 65/4076 725/109 |
| 2014/0130087 A1 | 5/2014 | Cho et al. |
| 2014/0142958 A1 | 5/2014 | Sharma et al. |
| 2014/0149395 A1 | 5/2014 | Nakamura et al. |
| 2014/0196071 A1 | 7/2014 | Terpstra et al. |
| 2014/0219495 A1 | 8/2014 | Hua |
| 2014/0267907 A1 | 9/2014 | Downes et al. |
| 2014/0270337 A1 | 9/2014 | Zhao et al. |
| 2014/0279549 A1 | 9/2014 | Petrovic et al. |
| 2014/0325550 A1 | 10/2014 | Winograd et al. |
| 2014/0325673 A1 | 10/2014 | Petrovic |
| 2015/0030200 A1 | 1/2015 | Petrovic et al. |
| 2015/0043728 A1 | 2/2015 | Kim et al. |
| 2015/0043768 A1* | 2/2015 | Breebaart .......... H04N 1/32149 382/100 |
| 2015/0063659 A1 | 3/2015 | Poder et al. |
| 2015/0093016 A1 | 4/2015 | Jiang et al. |
| 2015/0121534 A1 | 4/2015 | Zhao et al. |
| 2015/0170661 A1 | 6/2015 | Srinivasan |
| 2015/0229979 A1 | 8/2015 | Wood et al. |
| 2015/0261753 A1 | 9/2015 | Winograd et al. |
| 2015/0264429 A1 | 9/2015 | Winograd et al. |
| 2015/0324947 A1 | 11/2015 | Winograd et al. |
| 2015/0340045 A1 | 11/2015 | Hardwick et al. |
| 2016/0037189 A1 | 2/2016 | Holden et al. |
| 2016/0055606 A1 | 2/2016 | Petrovic et al. |
| 2016/0055607 A1 | 2/2016 | Petrovic et al. |
| 2016/0057317 A1* | 2/2016 | Zhao ................. H04N 21/4627 348/515 |
| 2016/0148334 A1 | 5/2016 | Petrovic et al. |
| 2016/0150297 A1 | 5/2016 | Petrovic et al. |
| 2016/0182973 A1* | 6/2016 | Winograd .......... G06F 17/3079 725/25 |
| 2016/0241932 A1 | 8/2016 | Winograd et al. |
| 2017/0272839 A1 | 9/2017 | Winograd et al. |

FOREIGN PATENT DOCUMENTS

| | | |
|---|---|---|
| EP | 2489181 | 8/2012 |
| EP | 2899720 | 7/2015 |
| JP | 2004163855 | 6/2004 |
| JP | 2004173237 | 6/2004 |
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 10201016712 | 2/2011 |
| KR | 1020120083903 | 7/2012 |
| KR | 1020120128149 | 11/2012 |
| KR | 20130078663 | 7/2013 |
| KR | 1020130074922 | 7/2013 |
| KR | 101352917 | 1/2014 |
| KR | 10201424049 | 7/2014 |
| WO | WO 2000059148 | 10/2000 |
| WO | WO 2005017827 | 2/2005 |
| WO | WO 2005038778 | 4/2005 |
| WO | WO 2006051043 | 5/2006 |
| WO | WO 2008045880 | 4/2008 |
| WO | WO 2009031082 | 3/2009 |
| WO | WO 2010073236 | 7/2010 |
| WO | WO 2010135687 | 11/2010 |
| WO | WO 2011046590 | 4/2011 |
| WO | WO 2011116309 | 9/2011 |
| WO | WO 2012177126 | 12/2012 |
| WO | WO 2012177874 | 12/2012 |
| WO | WO 2013025035 | 2/2013 |
| WO | WO 2013163921 | 11/2013 |
| WO | WO 2014014252 | 1/2014 |
| WO | WO 2015138798 | 9/2015 |
| WO | WO 2015168697 | 11/2015 |
| WO | WO 2015174086 | 11/2015 |
| WO | WO 2016028934 | 2/2016 |
| WO | WO 2016028936 | 2/2016 |
| WO | WO 2016029055 | 2/2016 |
| WO | WO 2016086047 | 6/2016 |

OTHER PUBLICATIONS

Aris Technologies, Inc. "Audio Watermarking System to Screen Digital Audio Content for LCM Acceptance," May 1999 (17 pages).

Bangaleea, R., et al., "Performance improvement of spread spectrum spatial-domain watermarking scheme through diversity and attack characterisation," *IEEE Africon*, pp. 293-298, 2002.

Extended European Search Report dated Sep. 21, 2017 for European Application No. 15762332.3 (9 pages).

(56) References Cited

OTHER PUBLICATIONS

Furon, T., "A constructive and unifying framework for zero-bit watermarking," CS.MM, Jan. 12, 2007.

Hartung, F., et al., "Watermarking of MPEG-2 encoded video without decoding and re-coding," *Proc. SPIE Multimedia Computing and Networking* 97, 3020:264-274, Feb. 1997.

Hartung, F., et al., "Watermarking of uncompressed and compressed video," *Signal Processing*, 3(66):283-301, May 1998.

International Search Report and Written Opinion dated Apr. 12, 2016 for International Application No. PCT/US2015/066872, filed Dec. 18, 2015 (7 pages).

International Search Report and Written Opinion dated Aug. 13, 2015 for International Application No. PCT/US2015/029097, filed May 4, 2015 (14 pages).

International Search Report and Written Opinion dated Dec. 7, 2015 for International Application No. PCT/US2015/045960, filed Aug. 19, 2015 (14 pages).

International Search Report and Written Opinion dated Jan. 21, 2016 for International Application No. PCT/US2015/046166, filed Aug. 20, 2015 (8 pages).

International Search Report and Written Opinion dated Jan. 28, 2016 for International Application No. PCT/US2015/045964, filed Aug. 19, 2015 (8 pages).

International Search Report and Written Opinion dated Mar. 15, 2016 for International Application No. PCT/US2015/062514, filed Nov. 24, 2015 (10 pages).

International Search Report and Written Opinion dated May 28, 2015 for International Application No. PCT/US2015/020282, filed Mar. 12, 2015 (7 pages).

Kalker, T., et al., "System issues in digital image and video watermarking for copy protection," *Proc. IEEE Int. Conf. on Multimedia Computing and Systems*, pp. 562-567, Jun. 1999.

Kirovski, D., et al., "Multimedia content screening using a dual watermarking and fingerprinting system," *Proceedings of the tenth ACM international conference*, pp. 372-381, 2002.

Kirovski, D., et al., "Multimedia content screening using a dual watermarking and fingerprinting system," *Multimedia '02 Proceedings of the tenth ACM international conference on Multimedia*, 2002 (11 pages).

Office Action dated Jul. 28, 2016 for Korean Patent Application No. 10-2016-7002289 (11 pages).

Office Action dated Jun. 10, 2016 for Korean Patent Application No. 10-2016-7002291 (19 pages).

Office action dated Nov. 30, 2016 for Korean Patent Application No. 10-2016-7002289 (4 pages).

Verance Corporation, "Confirmedia," PowerPoint presentation made to National Association of Broadcasters, Apr. 24, 2001 (40 pages).

Zhao, J., "A WWW service to embed and prove digital copyright watermarks," *Proc. European Conf. on Multimedia Applications, Services and Techniques (ECMAST'96)*, May 1996 (15 pages).

Zhao, J., "Applying digital watermarking techniques to online multimedia commerce," *Proc. Int. Conf. on Imaging Science, Systems and Applications (CISSA'97)*, Jun./Jul. 1997 (7 pages).

\* cited by examiner

Payload Data Table

Domain ID: 5837FE00

| Sequence ID | Channel | Media Time | URL |
|---|---|---|---|
| 62801 | XBC-East | 3/1/2014 16:28:43.195 | xbc.tv/p12?e=7.5 |
| 62802 | XBC-East | 3/1/2014 16:29:44.695 | xbc.tv/p12?e=7.5&m=77ee |
| ...... | ...... | ...... | ...... |

FIG. 4

FIG. 8(A)
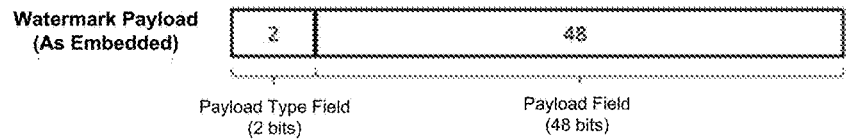
FIG. 8(B)
| Payload Type Field value | Meaning |
|---|---|
| 00b | (Reserved) |
| 01b | Payload Field is of type "Small Domain" |
| 10b | Payload Field is of type "Medium Domain" |
| 11b | Payload Field is of type "Large Domain" |
FIG. 8(C)
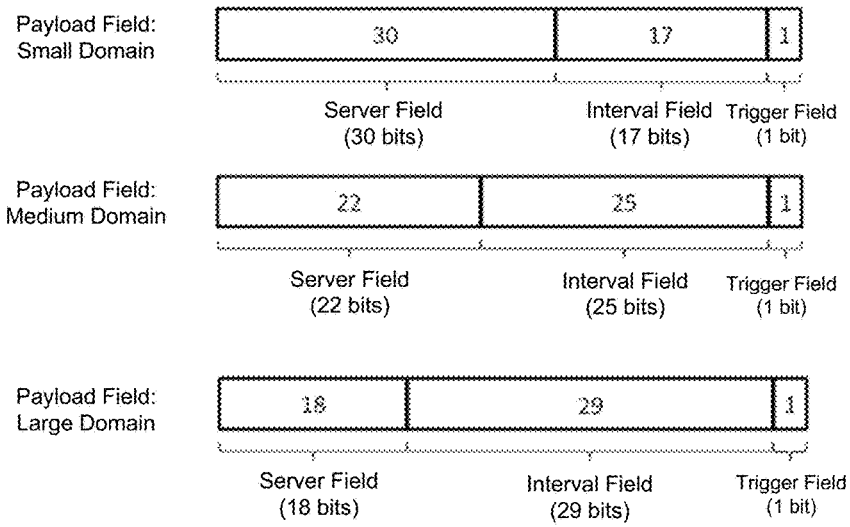

| Domain Type | Server Code Range (hexadecimal) | Interval Code Range (hexadecimal) |
|---|---|---|
| Small Domain | 40000000-7FFFFFFF | 00000000-0001FFFF |
| Medium Domain | 80000000-803FFFFF | 00000000-01FFFFFF |
| Large Domain | C0000000-C003FFFF | 00000000-1FFFFFFF |

FIG. 8(D)

| Domain Type | Number of Domains | Duration Per Domain |
|---|---|---|
| Small | 1,073,741,824 | 54.6 hours |
| Medium | 4,194,304 | 1.59 years |
| Large | 262,144 | 25.5 years |

FIG. 8(E)

INTERACTIVE CONTENT ACQUISITION USING EMBEDDED CODES

RELATED APPLICATIONS

This application is a continuation of and claims priority to U.S. patent application Ser. No. 15/139,063, filed Apr. 26, 2016, which claims priority to U.S. patent application Ser. No. 14/656,578, filed on Mar. 12, 2015, now U.S. Pat. No. 9,596,521, which claims priority to U.S. Provisional Patent Application No. 61/952,840, filed on Mar. 13, 2014, and U.S. Provisional Patent Application No. 61/953,668, filed on Mar. 14, 2014. The entire contents of the above noted applications are incorporated by reference as part of the disclosure of this document.

TECHNICAL FIELD

The subject matter of this patent document relates to management of multimedia content and more specifically using watermarks to facilitate recognition and utilization of multimedia content.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content. A multimedia content, such as an audiovisual content, often consists of a series of related images, which, when shown in succession, can impart an impression of motion, together with accompanying sounds, if any. Such a content can be accessed from various sources including local storage such as hard drives or optical disks, remote storage such as Internet sites or cable/satellite distribution servers, over-the-air broadcast channels, etc.

In some scenarios, such a multimedia content, or portions thereof, may contain only one type of content, including, but not limited to, a still image, a video sequence and an audio clip, while in other scenarios, the multimedia content, or portions thereof, may contain two or more types of content such as audiovisual content and a wide range of metadata. The metadata can, for example include one or more of the following: channel identification, program identification, content and content segment identification, content size, the date at which the content was produced or edited, the owner and producer identification of the content, timecode identification, copyright information, closed captions, and locations such as URLs where advertising content, software applications, interactive services content, and signaling that enables various services, and other relevant data that can be accessed. In general, metadata is the information about the content essence (e.g., audio and/or video content) and associated services (e.g., interactive services, targeted advertising insertion).

The metadata can enable content management, annotation, packaging, and search throughout content production and distribution value chain. Since the introduction of digital TVs, metadata has been introduced to enable digital interactive features and services. Various standardization efforts (such as MPEG-7, MPEG-21, TV-Anytime, DVB-SI, ATSC) strive to produce metadata standards with predefined data structures and transport methods for describing essence to support interoperability and unified services.

While such metadata may be useful in some applications, especially for enabling broadcast interactive services, they must be interleaved, prepended or appended to a multimedia content, which occupies additional bandwidth and, more importantly, can be lost when content is transformed into a different format (such as digital to analog conversion, transcoded into a different file format, etc.), processed (such as transcoding), and/or transmitted through a communication protocol/interface (such as HDMI, adaptive streaming).

BRIEF DESCRIPTION OF THE DRAWINGS

FIG. 4 provides an example of how watermark payload can be associated with media time and interactive content.

FIG. 8(A) illustrates a watermark payload structure in accordance with an exemplary embodiment.

FIG. 8(B) is a table describing Payload Type values in accordance with an exemplary embodiment.

FIG. 8(C) illustrates a structure including Large Domain, Medium Domain, and Small Domain fields in accordance with an exemplary embodiment.

FIG. 8(D) is a table illustrating server code and interval code values in accordance with an exemplary embodiment.

FIG. 8(E) is a table illustrating the number of domains and durations per domain in accordance with an exemplary embodiment.

SUMMARY OF CERTAIN EMBODIMENTS

Figure 1:
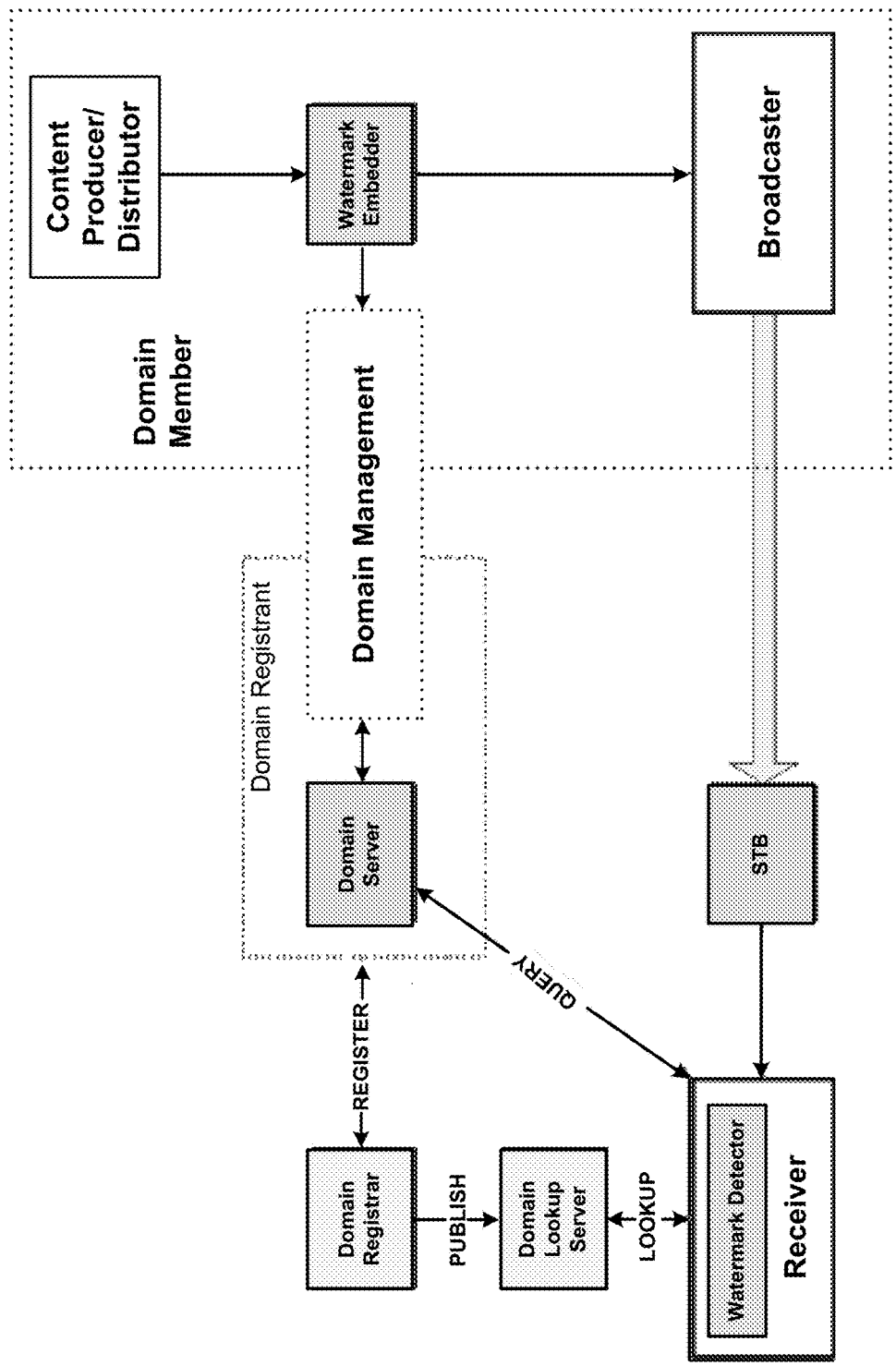
FIG. 1 illustrates a system for providing automatic content recognition and acquisition of interactive content in accordance with an exemplary embodiment.

The disclosed technology facilitates automatic recognition of a content, and enable acquisition of metadata associated with the content.

One aspect of the disclosed technology relates to a method for obtaining associated information for a multimedia content. The method includes receiving a content at a receiver device equipped with a watermark detector and performing watermark detection on the received content to extract a payload of one or more embedded watermarks. The payload includes a first field that includes a server identifier and a second field that includes an interval identifier associated with the server identifier. The first field provides a mapping to an Internet address accessible to retrieve metadata associated with content segments identified by the watermark payload. The method further includes, based on the detected watermark payload, forming a query and transmitting the query to a server identified by the Internet address, and receiving a response to the query from the server, the response including metadata associated with the content.

In one exemplary embodiment, the value of the first field is assigned by a central authority to domain registrants, and each domain registrant controls an assignment and usage of the second field. In another exemplary embodiment, a correspondence between the first field and the Internet addresses is pre-established at least in-part by a registrar server. In yet another exemplary embodiment, the mapping is stored in the receiver device in a memory. In another exemplary embodiment, the receiver device receives the mapping or the Internet address in response to a lookup request including the first field to a lookup server. In one exemplary embodiment, the query is a standardized query that is used to obtain the metadata corresponding to a particular value of the interval identifier. In still another exemplary embodiment, the payload includes a third field that is indicative of availability of the metadata associated with a content interval that is identified by the interval identifier. In yet another exemplary embodiment, the query is formed and transmitted to the server upon detection of a change in a value of the third field.

According to one exemplary embodiment, the payload is further structured to include a payload type field that identifies the payload as corresponding to one of a small domain, a medium domain or a large domain. In one particular embodiment, the payload is 50 bits long and the payload type field is a 2-bit field. In another particular embodiment, the payload that corresponds to a small domain includes a 30-bit first field, a 17-bit second, and a 1-bit interactive bit, the payload that corresponds to the medium domain includes a 22-bit first field, a 25-bit second field, and a 1-bit interactive bit, and the payload that corresponds to the large domain includes an 18-bit first field, a 29-bit second field, and a 1-bit interactive bit. In one exemplary embodiment, the interactive bit provides an indication as to whether or not an interactive content is available.

According to another embodiment, the first field specifies a server code, the second field specifies an interval code that is associated with a specific interval of the content, and each server code is assigned by a central authority to one of a content producer, a content distributor, or a service provider. In yet another embodiment, the metadata includes instructions that allows the receiver device to execute particular interactive services associated with a content interval that is identified by the interval identifier. In one particular embodiment, the metadata identifies one or more of the following: an Internet address of an interactive services server, or one or more parameters that indicate when and how an interactive service can be configured.

Another aspect of the disclosed embodiments relates to a device capable of receiving a multimedia content. The device includes a watermark detector implemented at least in-part using electronic circuitry to detect one or more watermarks from the received multimedia content. The detected watermarks include a payload that comprises a first field that includes a server identifier and a second field that includes an interval identifier associated with the server identifier. The first field provides a mapping to an Internet address accessible to retrieve metadata associated with content segments identified by the watermark payload. The device further includes a processor and a memory including processor executable instructions embodied thereupon. The instructions, upon execution, cause the processor to form a query. The device also includes a communication component implemented at least in-part using electronic circuitry to transmit the query to a server identified by the Internet address, and to receive a response to the query from the server. The response includes metadata associated with the content.

In one exemplary embodiment, value of the first field is assigned by a central authority to domain registrants, and each domain registrant controls an assignment and usage of the second field. In another exemplary embodiment, a correspondence between the first field and the Internet addresses is pre-established at least in-part by a registrar server. In still another embodiment, the mapping is stored in the receiver device and is accessible for use by the receiver device for retrieving the Internet address based on the first field. In yet another embodiment, the communication component is configured to transmit a lookup request including the first field to a lookup server and to receive the mapping or the Internet address in response to the lookup request.

According to another exemplary embodiment, the instructions executed by the processor form a lookup query based on a value of the first field, and the communication component is configured to transmit the lookup request to a lookup server and to receive the Internet address. In this particular embodiment, the instructions executed by the processor further form the query as a standardized query based on the Internet address and a particular value of the interval identifier, and the communication component further is configured to transmit the standardized query to a server and to receive the metadata corresponding to the particular value of the interval identifier. In one exemplary embodiment, the instructions executed by the processor form the query upon detection of a change in a value of the third field.

In another exemplary embodiment associated with the above device, the payload includes a third field that is indicative of availability of the metadata associated with a content interval that is identified by the interval identifier. In still another embodiment, the payload is further structured to include a payload type field that identifies the payload as corresponding to one of a small domain, a medium domain or a large domain. In one specific implementation, the payload is 50 bits long and the payload type field is a 2-bit field. In another specific implementation, the payload corresponding to a small domain includes a 30-bit first field, a 17-bit second, and a 1-bit interactive bit, the payload corresponding to the medium domain includes a 22-bit first field, a 25-bit second field, and a 1-bit interactive bit, and the payload corresponding to the large domain includes an 18-bit first field, a 29-bit second field, and a 1-bit interactive bit. In still another embodiment, the interactive bit provides an indication as to whether or not an interactive content is available.

According to one exemplary embodiment associated with the above device, the first field specifies a server code, the second field specifies an interval code that is associated with a specific interval of the content, and each server code is assigned by a central authority to one of a content producer, a content distributor, or a service provider. In yet another embodiment, the instructions executed by the processor causes the processor to use the metadata to execute particular interactive services associated with a content interval that is identified by the interval identifier. In another exemplary embodiment, the metadata identifies one or more of the following: an Internet address of an interactive services server, or one or more parameters that indicate when and how an interactive service can be configured.

Another aspect of the disclosed technology relates to a computer program product embodied on one or more non-transitory computer readable media. The computer program product includes program code for receiving a content at a receiver device equipped with a watermark detector, and program code for performing watermark detection on the received content to extract a payload of one or more embedded watermarks. The payload includes a first field that includes a server identifier and a second field that includes an interval identifier associated with the server identifier. The first field provides a mapping to an Internet address accessible to retrieve metadata associated with content segments identified by the watermark payload. The computer program product further includes program code for, based on the detected watermark payload, forming a query and transmitting the query to a server identified by the Internet address, and program code for, receiving a response to the query from the server, the response including metadata associated with the content.

Another aspect of the disclosed technology relates to a device that includes a processor, and a memory including processor executable code. The processor executable code when executed by the processor configures the device to extract one or more watermarks that are embedded in a multimedia content, where the extracted watermarks include a payload that comprises a first field that includes a server identifier and a second field that includes an interval identifier associated with the server identifier. The first field provides a mapping to an Internet address accessible to retrieve metadata associated with content segments identified by the watermark payload. The processor executable code when executed by the processor further configures the device to form a query, transmit the query to a server identified by the Internet address, and receive a response to the query from the server, the response including metadata associated with the content.

DETAILED DESCRIPTION

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

As noted earlier, typical techniques for incorporating metadata into multimedia content often rely on interleaving, prepending or appending the metadata fields or packets with the associated multimedia content. These techniques have proven to be unreliable under certain circumstances, such as when the multimedia content is transformed into a different format, which can cause the metadata to be lost. Notably, in some scenarios, an intervening device such as a set-top box issued by a multichannel video program distributor (MVPD) receives a multimedia content from a content source and provides the uncompressed multimedia content to a television set or another presentation device, which can result in the loss of various metadata and functionalities such as interactive applications that would otherwise accompany the multimedia content. Therefore alternative techniques for content identification can complement or replace metadata multiplexing techniques.

The disclosed embodiments enable automatic content recognition (ACR) using embedded watermarks. The watermarks can be embedded in the audio and/or video portions of a content and are substantially imperceptible to a viewer (or listener) of the content. The watermarks are also immune to various content processing operations and channel impairments, such as compression and decompression, cropping, scaling, transcoding, format conversion, noise addition, acoustic propagation, optical (e.g., free space) transmission, digital-to-analog (D/A) and analog-to-digital (A/D) conversions and the like. Once detected by a watermark detector (also sometimes referred to as a watermark extractor), the payload of the watermark can be used to identify the content, as well as the current temporal position (timing information) of the content being viewed, and recover the metadata associated with the identified content and temporal position to enable various operations, such as receiving an additional content, performing dynamic advertising insertion, or participating in an interactive opportunity. The viewing device (or an associated device) is connected to the Internet (or more generally, to a remote database) for the retrieval of the additional content, for participating in the interactive opportunities or other services.

The disclosed embodiments further comply with the requirements of the Advanced Television Systems Committee (ATSC), Inc., Call for Proposals For ATSC-3.0 AUTOMATIC CONTENT RECOGNITION WATERMARKING SOLUTIONS—ATSC Technology Group 3 (ATSC 3.0) (S33 Doc. 067r3). In particular, some embodiments provide for the embedding of watermarks using a watermark inserter into a content at a content source, that is subsequently transmitted to a MVPD, which provides the content to a set-top box (or similar device) at consumers' homes. The content that comes from the set-top box (typically via a HDMI interface) is presented on a viewing device ("Receiver") that is compliant with ATSC 3.0 standard. The uncompressed audio/video at the viewing device includes embedded watermarks that enables the identification of the content and the current position of the content being viewed. The identified content and the current temporal position of the content are used to recover the metadata that enables the viewing device to receive additional contents, services or features associated with the presented content. It should be noted that while in some embodiments, a receiver (sometime also referred to as a receiver device) is a separate component than the set-top box, in other variations a receiver device may include, or be part of a larger device that includes, any one or combinations of additional components such as a set-top box a display, keyboard or other user interface devices, or a watermark detector, as well as processors (e.g., microprocessors, digital signal processors (DSPs), etc.) and other circuitry that may be needed for implementation of such device, or devices.

In some embodiments of the present application, the information conveyed by the embedded watermarks allows a viewing device to identify the channel currently being watched and recognize a channel change within a short period of time (e.g., 2 seconds). Further, the information conveyed by the embedded watermarks allows a viewing device to identify the content and the current position of the content being viewed, including short content such as interstitials. Information conveyed by the embedded watermarks also allows a viewing device to discover a remote location (for example a URL of a remote server) for accessing metadata information about the content and associated services. It allows a viewing device to identify the temporal position within the content being rendered, to a level of per sample or access unit accuracy. Additionally, the information conveyed by the embedded watermarks allows a viewing device to receive a time-sensitive event trigger in real time which may activate the viewing device to perform various operations such as requesting for the metadata from the remote location.

The methods, systems, devices and computer program products that are described in this document further enable centralized management of the high-level namespace associated with the watermarks and, at the same time, enable decentralized namespace lookup. The disclosed embodiments further allow key points of interoperability to be standardized to achieve independent management of watermarks within a namespace, as well as distributed and independent operation and management of related data services associated with individual broadcast content.

The watermark structure in some exemplary embodiments includes the following fields: a Domain ID and a Sequence ID. Each Domain ID is assigned by a central authority to a Domain Registrant who controls assignment and use of the Sequence ID codes under that domain. Each Domain ID maps one-to-one to an Internet domain name which is used to retrieve metadata associated with Sequence IDs in that domain. Clients use a lookup service to find the domain name associations. A standardized query is used to obtain metadata matching a Sequence ID from servers in the domain. Note that the domain name associated with a Domain ID that is registered with the Domain Registrar for use in the Domain Lookup Service may be the same domain name that is used to serve interactive services for broadcast content that has the associated Domain ID embedded in a watermark within it or it may be a different domain name from which is used to serve the associated interactive services. A Sequence ID can be used to identify a content and the current temporal position of the content being viewed within the domain specified by the Domain ID.

Example Watermark Payload: According to an exemplary embodiment, a 50-bit payload is embedded in every 1.5 seconds of the content. In this exemplary embodiment, the watermark payload can be standardized with the following structure: [Payload Type:2] [Payload:48]. That is, the rightmost 48 bits are designated to carry the payload and the 2 left-most bits are designated to carry the Payload Type. For example, the Payload Type values can be in the range 0 to 3, where a "0" designates a Reserved payload type, a "1" designate a Large Domain payload type, a "2" designates a Medium Domain payload type, and a "3" designates a Small Domain payload type. The payload type values can thus each describe the structure of the payload.

In some exemplary embodiments, the payload structure for each payload type is defined as follows:
Small Domain: [Domain field:30 bits][Sequence field:17 bits][Trigger field:1 bit]
Medium Domain: [Domain field:22 bits][Sequence field:25 bits][Trigger field:1 bit]
Large Domain: [Domain field:18 bits][Sequence field:29 bits][Trigger field:1 bit]

The Domain field from any structure can be mapped into a unique Domain ID by prepending the Payload Type value to the Domain field and zero-padding (on the right) to 32 bits. For ASCII encoding, the Domain ID can be represented as an 8-character hexadecimal value. Domain field value of 0 can be reserved in all domains. The Sequence field from any structure can be mapped directly into a Sequence ID. For ASCII encoding, hexadecimal representation of the Sequence field (leading zeroes optional) can be utilized. Sequence IDs with decimal value of 1024 or less can be reserved for use as Control Codes. Control Codes are currently reserved.

The trigger bit, when set (e.g. to a value of "1"), informs the Receiver of an event that may activate the Receiver to perform various operations such as requesting metadata from the domain server. It indicates that further services or features, such as interactive content or advertising insertion associated with the Sequence ID should be available to the Receiver from the domain server associated with the payload's Domain ID. In some implementations the trigger field can include multiple bits. In some implementations, the trigger field may be used for other purposes. For example, a field can be defined as an "overwriteable" bit which indicates whether or not a preexisting watermark previously embedded by a content distributor or content producer can be replaced by another distributor (this is sometimes referred to as watermark "replacing"). In this case, a watermark embedder first checks for the presence of a watermark payload, and verifies the value of such overwriteable' bit if a payload is preset, and decides if a new watermark payload can be embedded to replace the pre-existing one according to the value of the bit. In another example, another field can be defined as an "over-watermarkable" bit which indicates whether or not a new watermark payload can be embedded in the content to co-exists with a pre-existing one so that both can be extracted (this is sometimes referred to as watermark "layering"). In some implementations, additional fields may be added into the watermark payload structure to support these two exemplary use cases. Because the "overwritable' bit and/or "over-watermarkable" bit is associated with a content segment identified by a Sequence ID, each segment of a content may set these bits differently; thus, allowing some segments to be overwritable and/or overwatermarkable.

In another embodiment, authorization of overwriting watermarks or over-watermarking can be performed via a domain server. Such authorization may be associated with one or more Domain IDs and/or Sequence IDs. When a watermark embedder detects a pre-existing watermark payload, it sends the payload to a domain server according to the Domain ID of the payload, and receives a response indicating whether such payload can be replaced by a new payload or a new payload can be layered on top of the pre-existing one.

In some cases, a content distributor may want to check the services enabled by the pre-existing watermark payload before making a decision to replace the pre-existing payloads or layer new payloads in some or all content segments. The distributor can query the domain servers identified by the pre-existing payload for all relevant metadata identifying the services, inspect it, select metadata associated with some content segments, and post the selected metadata to the domain servers preferred by such distributor. The distributor can introduce new services associated with the pre-existing payloads. Alternatively, the distributor can also embed new payloads into some segments and associate new services with these segments enabled by the new payloads on the domain server. Furthermore, it is also possible for the distributor to embed new payloads in some segments on top of pre-existing payloads. Thus, both new payloads and pre-existing payloads can be detected and provided to a domain server, a receiver may receive multiple triggers identified by the new payload or the pre-existing payload associated with a segment. The receiver may choose the services caused by one of the triggers according to user preference or pre-configuration, or bring all services caused by multiple triggers to the user.

One of the services caused by triggers may be presentation of a secondary audiovisual content, typically delivered via Internet, such as pre-fetched advertisements. Such audiovisual content is treated as regular audiovisual content, i.e., it can also be watermarked and watermark-based triggers can be registered with a domain server. Thus, the watermark payloads in the secondary content can also trigger interactive services. This is sometimes called "nested triggers".

In an alternative embodiment, the watermark embedder always overwrites existing watermarks, but keeps track of preexisting watermarks, and their relationship to newly embedded watermarks, and informs the domain server about it. This is particularly useful for live broadcasts, where examining the content for preexisting watermarks can go in parallel with watermark embedding/overwriting without causing any latency in the overwriting process. For example, the domain server can be informed that at the moment when the embedding of watermark with payload X has begun, the preexisting watermark with payload Y has been found, where the preexisting watermark begins T milliseconds before the newly embedded watermark. With this information, the domain server can later, when queried with payload X, calculate the timeline of preexisting watermarks, and provide the metadata about services in synchronization with timeline of the payload Y.

In yet another embodiment, multiple watermarks can be embedded into the same content using distinct watermark embedding parameters. For example, content producer may use one set of parameters for its watermark, but content distributor may have a distinct parameter set that produces watermarks that substantially do not interfere with detection of content producer watermarks. Alternatively, embedding of watermarks with distinct parameters may be used to increase watermark code space, or overall watermark data throughput. This way, sometimes referred to as watermark layering, multiple watermarks may be detected by a receiver, and the receiver may access domain servers associated with each of them and obtain multiple services.

Using the above watermark payload structures, if we assume that a watermark payload has temporal duration of 1.5 seconds, over 250,000 Large Domains can be identified (e.g. for long-term continuous embedding) that would allow 25.5 years of uniquely marked content per domain. This structure further allows over 4 Million Medium domains to be uniquely identified (e.g. for continuous marking of Olympics-scale events, annual channel assignments, or long-term selective embedding) that would allow 1.5 years of uniquely marked content per domain. The structure for Small Domains allows unique identification of over 1 Billion Small Domains (e.g. shows) with 54 hours of uniquely marked content per domain. Depending on the payload type, a domain may be assigned to one or more 1) broadcasters or content producers; 2) MVPDs; 3) channels; 4) sport events; 5) shows; 6) movies; or 7) episodes.

The watermark payload can undergo various coding, modulation and formatting operations before being embedded into a content. For example, the payload may be error correction code (ECC) encoded, scrambled, interleaved with other packets, appended with a synchronization or registration header, encrypted or channel coded to form a sequence of bits with particular characteristics. Often, a watermark payload is repeatedly embedded in multiple portions of the host content to improve the detection reliability of the embedded watermarks. Once embedded, the embedded content can be processed by a watermark extractor to recover the embedded watermark bits (or, more generally, symbols), and perform the reverse of the above coding, modulation or formatting schemes to recover the payload. In some instances, statistical techniques are used to recover the embedded symbols from the content using multiple instances of embedded watermarks.

FIG. 1 illustrates a system for providing automatic content recognition for content that is provided by a broadcaster to a consumer device and acquisition of interactive content in accordance with an exemplary embodiment. The content is embedded with watermarks by a Domain Member prior to broadcast. For example, such a Domain Member can be a content producer or a Broadcaster. A Broadcaster transmits the content to one or more user premises. Such content is often received at a receiver such as a set top box (STB), where decompression and formatting operations may take place before the content is provided to the Receiver. Decompression and formatting may alternatively take place within the Receiver. The Receiver which includes a watermark detector, examines the received content for the presence of watermarks. The detection of watermarks may trigger further actions such as identifying a domain name associated with the detected watermark payload and sending a query to an identified domain server.

The Domain Registrar in FIG. 1 is a unique centralized entity responsible for registering Domain IDs and publishing the mapping between Domain IDs and domain names to Domain Lookup Servers. Domain registration is a process wherein a Domain ID is uniquely assigned to a Domain Registrant entity. The Domain Registrar provides Domain Registrant with a process (e.g., designated as REGISTER in FIG. 1) to establish and maintain the relationship between the Domain ID and a domain name (e.g., Internet format). Multiple Domain IDs may be mapped to the same domain name. The Domain Registrar further maintains a database of all mappings from Domain IDs to domain names. The Domain Registrar employs a standardized protocol (e.g., designated as PUBLISH in FIG. 1) to publish new and modified domain mappings to Domain Lookup Services that can include Domain Lookup Servers, as well as any other devices that may be needed to implement Domain Lookup Services. This protocol used by the Domain Registrar enables interoperability between the central Domain Registrar and all Domain lookup services. In some implementations, support for PUBLISH protocol is mandatory on both the Domain Lookup Servers and the Domain Registrar.

Referring again to FIG. 1, Domain Registrants are responsible for coordinating the use of Sequence IDs in watermarks by one or more Domain Members. The Domain Registrant may be a member of its domain. The Domain Registrant is also responsible for registering a domain name (to be associated with its assigned Domain ID) with the Domain Registrar.

Domain Lookup Server(s) maintain a copy of the Domain Registration database which maps each registered Domain ID to a domain name and keeps it current using the PUBLISH protocol with the Domain Registrar. Domain Lookup Server(s) also employ a standardized protocol (e.g., designated as LOOKUP in FIG. 1) to provide domain name mappings from the database in response to Domain ID lookup queries originated by the Receivers. In some embodiments, the use of a standardized LOOKUP protocol is necessary to obtain interoperability between any Receiver and any Domain Lookup Server, but does not need to be mandatory on either the Receivers or Domain Lookup Server(s) because a Receiver manufacturer can direct all lookup queries from devices that they manufacture to a private Domain Lookup Service and employ a non-standard protocol to do so. In some embodiments the Receivers are ATSC-compatible or ATSC-complaint. That is, those receivers comply with ATSC requirements, such as those under ATSC 3.0.

Domain Servers are Internet servers that are accessible at the domain name associated with a registered Domain ID and can provide metadata to Receivers in response to queries triggered by watermark detections. In some implementations, queries employ a standardized message protocol (e.g., designated as QUERY in FIG. 1). A query is initiated by a Receiver and provides the domain server with a Domain ID and Sequence ID. The Domain Server responds with available metadata (e.g. broadcast channel identifier, a broadcast segment identifier, a timecode, a signaling) associated with the provided Domain ID and Sequence ID. Domain servers are not required to provide data for all required data fields available for all queries. In some embodiments, support for the QUERY protocol is mandatory on all Receivers and Domain Servers in order to enable interoperability among all receivers and content. This protocol enables interoperability between all receivers and all domain servers and support may be mandatory on both the receivers and the domain servers.

Domain Management:

Domains are managed via coordinated interaction between a Domain Registrant and Domain Members (entities within a domain). Domain Management includes allocation of Sequence IDs within the domain to Domain Members, assignment of Sequence IDs to content segments, management of Sequence ID usage by watermark embedders, and/or distribution of metadata associated with Sequence IDs to Domain Servers. Standardization of protocols or processes for these functions may be valuable to obtain interoperability of professional systems, but is not essential for interoperability of devices. Domain Management may include analysis of the digital broadcast stream which contains both audiovisual broadcast content and multiplexed digital metadata to decode both watermarks and embedded digital metadata and automatically establish the association between watermark payloads present in the audio and video essence of the broadcast content and digital metadata present and associated with the same essence in the broadcast stream for population of the Domain Servers. Domain Management may also include functions and interfaces that allow broadcasters or content producers to edit the metadata extracted from the broadcast content or add new metadata for population of the Domain Servers.

The previously described watermark structure that comprises a domain identifier (Domain ID), a sequence identifier (Sequence ID) and a trigger field, can be used as an alternative method to deliver metadata (signaling) to receivers, and is of particular utility in scenarios where the receiver has access to the essence of the broadcast content (i.e. its audio and video) but not the complete digital broadcast stream which contains the metadata (signaling) in a multiplexed digital data stream. This may happen if the receiver obtains the broadcast content from an interface that does not include the portion of the multiplexed broadcast stream which includes the triggers, such as over an analog or HDMI interface. In such a scenario, the following exemplary sequence of operations can be implemented to allow a user to obtain the full set of features associated with the full broadcast content, as well as additional features that are enabled through the use of the disclosed technology. The exemplary sequence of operations is as follows. First, the name of a network server from which the metadata can be accessed ("domain name") is identified. Next, the identified server is queried to obtain the associated metadata. In one exemplary embodiment, the process of retrieving a metadata can be accomplished by placing a set trigger bit in a particular watermark payload to cause receivers to imitate the trigger retrieval process.

According to one exemplary embodiment, the Sequence IDs in a Domain are dynamically allocated to Domain Members by a Domain Manager (which performs Domain Management functions). Moreover, the Embedders of a Domain Member may be deployed in multiple facilities in various locations. They are managed by and connected with a Domain Member Embedder Manager via Internet, an enterprise network, or another appropriate communication link. A block of Sequence IDs (which can include one or more continuous Sequence IDs) may initially be allocated for each Embedder. When an Embedder needs more Sequence IDs, it sends a request to its Domain Member Embedder Manager for a new block of Sequence IDs. Such a request may be sent prior to performing watermark embedding or when the number of remaining Sequence IDs reaches a predefined number. Similarly, a Domain Manager initially allocates one or more blocks of Sequence IDs to a Member Embedder Manager. When a Member Embedder Manager needs more Sequence IDs, it sends a request to its Domain Manager for a new Sequence IDs. Both the Domain Manager and Domain Member Embedder Manager ensure that each Embedder has adequate Sequence IDs. In addition to Sequence ID allocation, a Domain Member Embedder Manager can also configure each Embedder it manages, including the Domain ID of the watermark payload to be embedded by such Embedder and other embedding parameters. It also collects the embedding logs and metadata of watermarked content from the Embedders and reports them to a Domain Manager. A Domain Manager may use this data for registering the allocated Sequence IDs and associating Sequence IDs with content segments and associated metadata in the Domain Server as described earlier.

Figure 2:
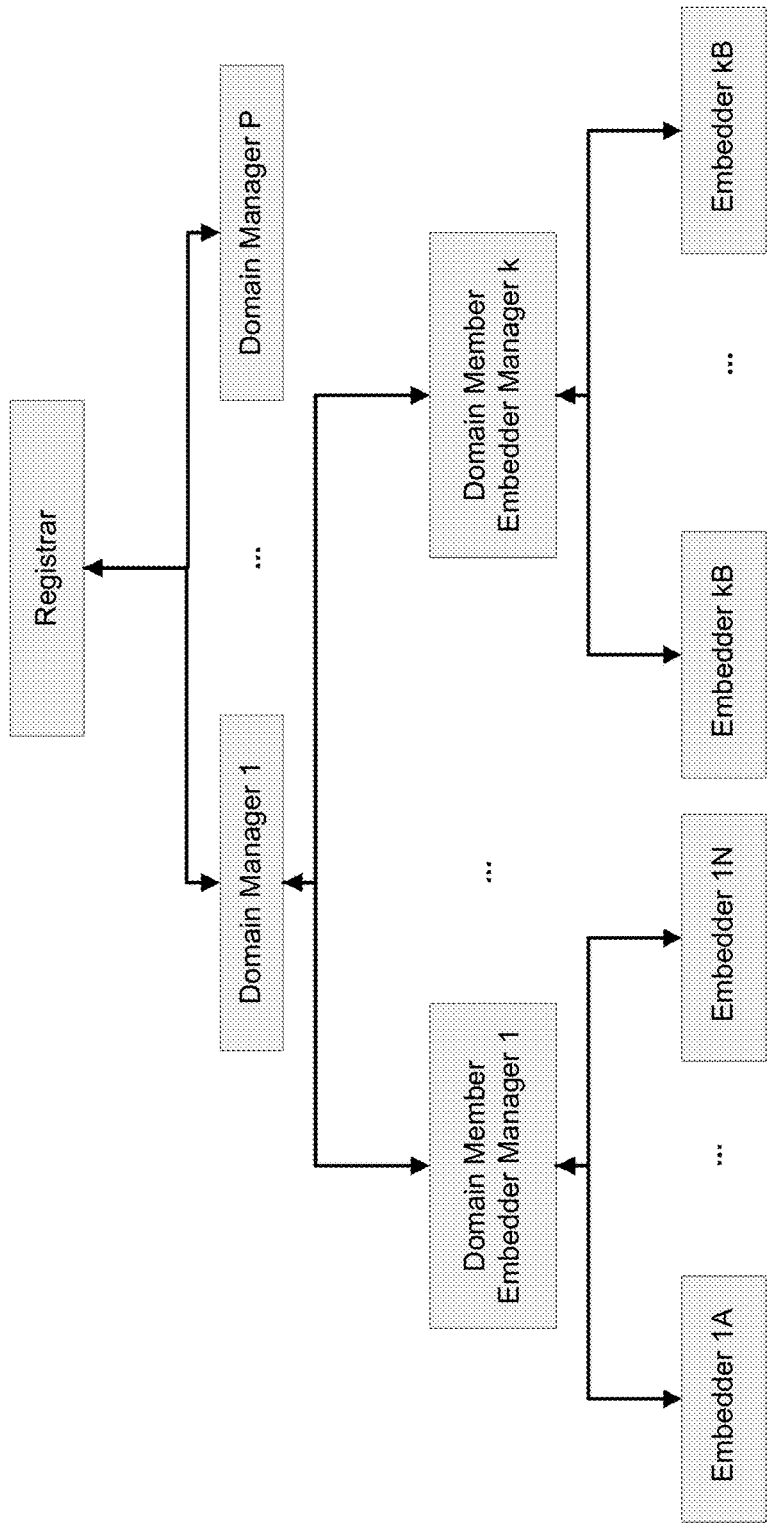
FIG. 2 illustrates a diagram of how a Registrar, Domain Managers, Domain Member Embedder Managers and Embedders can be connected in a hierarchical structure in accordance with an exemplary embodiment.

FIG. 2 illustrates a diagram of how a Registrar, Domain Managers, Domain Member Embedder Managers and Embedders can be connected in a hierarchical structure in accordance with an exemplary embodiment. As shown in FIG. 2, each Domain Member Embedder Manager (e.g., Domain Member Embedder Manager 1) may be associated with a plurality of Embedders (Embedders 1A through 1N), each Domain Manager (e.g., Domain Manager 1) can be associated with a plurality of Domain Member Embedder Managers (e.g., Domain Member Embedder Managers 1 through k), and a Registrar may be associated with a plurality of Domain Managers (e.g., Domain Managers 1 through P).

In one exemplary embodiment, a Domain can have more than one Domain Servers, each of which may serve a specific region and/or a Domain Member. In this case, the lookup services can be provided by a cluster of lookup servers in a hierarchical structure. For example, a Registrar level server first maps a Domain ID provided by a Receiver to a domain-level lookup server; and then such domain-level lookup server resolves the Domain ID to a specific Domain server.

Referring again to FIG. 1, the Receivers and Domain Lookup Services employ a standardized message protocol (e.g., designated as LOOKUP in FIG. 1) to query a Domain Lookup Service to provide the domain name associated with a Domain ID. The Domain ID-to-domain name mapping can be cached locally in the Receiver and the cache can be timed out periodically (e.g. with a time-to-live value) or refreshed as needed (e.g. if a server fails to respond). This protocol enables interoperability between all receivers (e.g., ATSC receivers) and all Domain Lookup Services. As noted earlier, support for a standardized LOOKUP protocol need not be mandatory for either the Receivers or the Domain Lookup Services because a receiver manufacturer (e.g., an ATSC receiver manufacturer) could provide their own domain lookup service and use a proprietary protocol for their interaction. Receiver manufacturers should be permitted to associate their receivers with a Domain Lookup Service of their choosing and may permit end-users to select a Domain Lookup Service to use. For one or more Domain IDs, Receiver manufacturers may also choose to use an alternate domain server whose name is registered with the Domain Registrar. For such Domain IDs, it is the responsibility of that manufacturer to ensure that they direct those queries to a domain server which is populated with timely and correct metadata associated with the Domain IDs and Segment IDs identified in the received watermark payloads. In such instances, the domain server may be populated as previously described from real-time analysis of the complete digital broadcast stream.

Referring again to FIG. 1, the Receiver employs a watermark detector to scan content it receives for a watermark payload. The receiver may activate the watermark detector only for content received separately from a complete digital broadcast stream and/or from a specific broadcast channel. When a watermark payload is detected, a Receiver may request associated metadata by querying an associated Domain Server. The trigger bit set in a watermark payload is a "hint" to the device that interactive content associated with the Sequence ID should be available from the domain server associated with the payload's Domain ID. The Receiver may therefore use the presence of the trigger bit set as the basis for determining when to initiate a Domain Server query. The Receiver may further choose to initiate a Domain Server query in other contexts, such as when a watermark payload is detected after content playback has begun (e.g. after the Receiver is first turned on), after channel change, after network connectivity is restored following a period of interruption, or when a signaling is provided in a previous trigger that such 'hint' may be ignored.

In implementations that use the trigger bit, such a bit can support the use case where a broadcaster chooses to embed the watermark throughout its content (maybe for other applications; e.g. audience measurement, advertisement tracking, etc.) but only signals the availability of special content (e.g., ATSC-compatible interactive content) for certain portions of the content. In the absence of such trigger bit, millions of TV sets may attempt to query their server when there is no interactive content available. It should be noted that in some implementations the trigger bit is not needed. For example, when a receiver queries triggers from a domain server, it may request for a set of triggers for a particular duration of the content to reduce the query traffic.

The queried domain server responds to the Receiver's query by providing the stored metadata associated with the provided watermark payload information. The Receivers may then use the metadata received from the domain server to access, configure, and execute interactive services. Such metadata may include, but is not limited to, a broadcast channel identifier, an identifier that uniquely identifies the broadcast content and broadcast segment, a timecode, a trigger, an event or an action, supplement content, advertising content, or a server location (e.g., URL) where the above can be obtained. The Receivers should be resilient to an absent, delayed, or malformed response from a domain server.

The following provides an exemplary scenario in which the trigger field may be used to obtain metadata that enables additional features related to the content. In some implementations, where the timeline of a broadcast is broken into contiguous "segments" of content (e.g., show, ad, ad, promo, ad, show), for individual segments, metadata may be associated with particular moments on the segment timeline. The trigger field indicates whether or not such metadata is available. The metadata may contain instructions for how, when, or under what conditions a receiver should load and execute particular content or service, such as an interactive service associated for the segment. The metadata may identify an Internet server from which the interactive services can be loaded. The metadata may additionally identify a segment which is being displayed with which, e.g., the interactive services are associated. The metadata may additionally identify one or more parameters for when and how, e.g., the interactive service should be configured.

Figure 3:
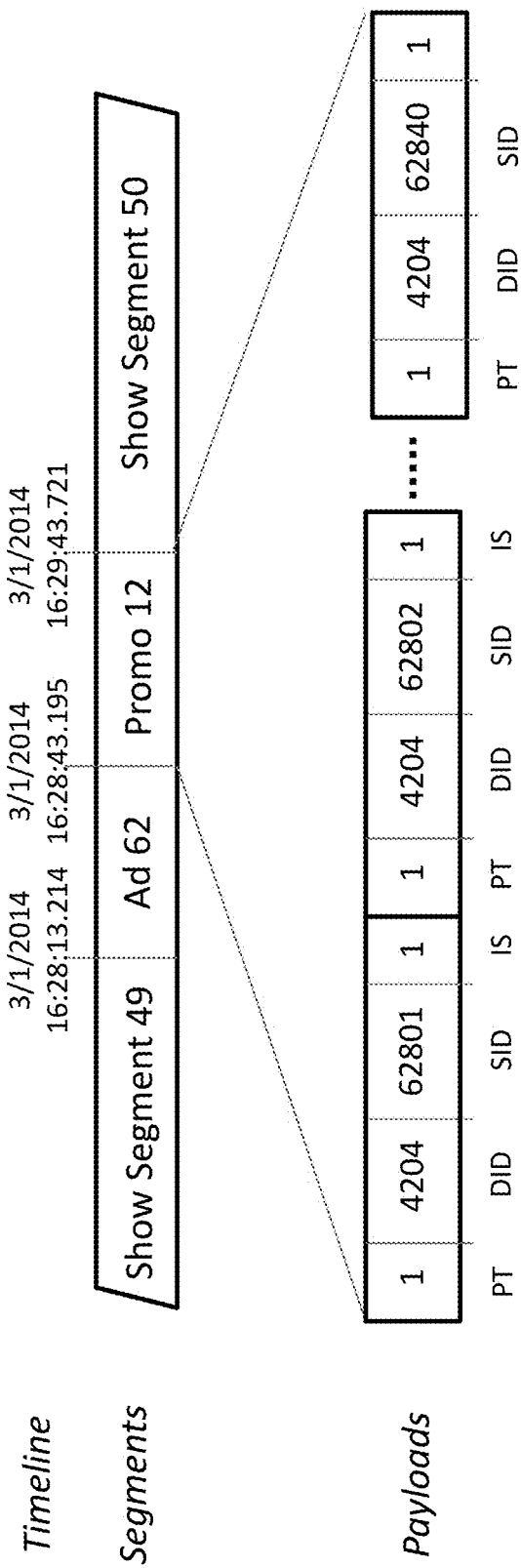
FIG. 3 illustrates the relationship between the timeline of a broadcast content and the embedded watermarks in accordance with an exemplary embodiment.

FIG. 3 illustrates the relationship between the timeline of a broadcast content and the embedded watermarks in accordance with an exemplary embodiment. The depicted broadcast content timeline includes two broadcast segments of the main program (i.e., show segments 49 and 50), an advertisement segment 62 and a promo segment 12. The lower part of FIG. 3 illustrates the payload of the watermark embedded in the promo segment 12 that includes a payload type (PT) field (shown as having a value of 1), a domain ID (DID), a segment ID (SID) and a trigger field (IS). FIG. 3 shows consecutive SID values (62801 to 62840) that are embedded in each of 40 segments within the promo segment 12. The DID value for all 40 segments is 4204, the payload type is 1, and the trigger field is set to 1.

FIG. 4 provides an example of how watermark payload can be associated with media time and interactive content in accordance with exemplary embodiments. In particular, the table in FIG. 4 shows that the Sequence ID 62801 within the Domain ID 5837FE00 is associated with media time 16:28:43.195, and is mapped to)(BC-East channel, which is associated with an interactive feature that can be accessed from the URL xbc.tv/p12?e=7.5. Similarly, FIG. 4 shows that Sequence ID 62802 is associated with media time 16:29:44.695, and is mapped to)(BC-East channel, which is associated with an interactive feature that can be accessed from the URL xbc.tv/p12?e=7.5&m=77ee. The table that is illustrated in FIG. 4 can be stored at a Domain Server and selected data can be provided to the Receivers in response to queries.

Figure 5A:
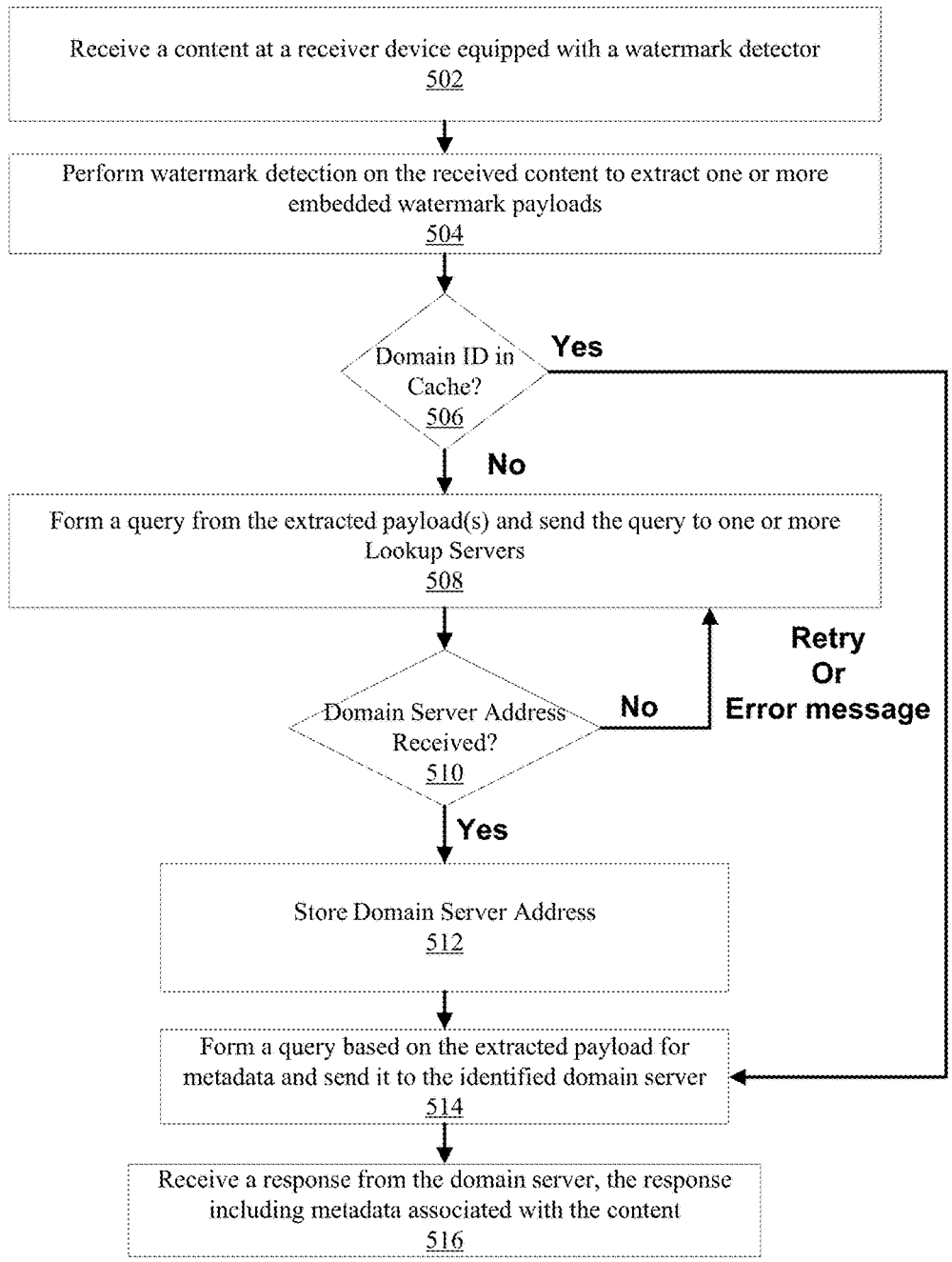
FIG. 5(A) illustrates a set of exemplary operations that can be carried out to provide automatic content recognition and to acquire associated metadata in accordance with an exemplary embodiment.

FIG. 5(A) illustrates a set of exemplary operations that may be carried out to provide automatic content recognition and to acquire associated metadata in accordance with an exemplary embodiment. The operations in FIG. 5(A) can be carried out by a receiver (such as the Receiver shown in FIG. 1). At 502, a content is received at a receiver device equipped with a watermark detector. The received content can, for example, be in uncompressed format. In some embodiments, the content may arrive at the receiver in compressed format and be decompressed within the receiver prior to watermark detection. At 504, watermark detection is performed on the received content to extract one or more embedded watermark payloads. At 506, it is determined whether or not the Domain ID from the extracted watermark payload is in the cache of the receiver. If the Domain ID is cached, the operations continue at 514. If the Domain ID does not reside in cache (or other local storage), at 508, the receiver forms a query from the extracted payload and sends the query to a Lookup Server to lookup a domain server corresponding to the Domain ID in the extracted payload. In some implementations, the URLs of one or more Lookup Servers are pre-configured in the receiver. At 510, it is determined whether or not the receiver receives a domain server address (e.g., a URL) and upon reception of the domain server address, the receiver, at 512, stores the Domain ID with the corresponding domain server address in the cache and, at 514, the receiver forms a query based on the extracted payload for metadata and sends it to the identified domain server. At 516, a response to the query is received from the domain server, the response includes metadata associated with the content. If the Lookup server fails to respond, the receiver may try another Lookup server. After failure of at least two trials, the receiver may notify the user of the error message.

Figure 5B:
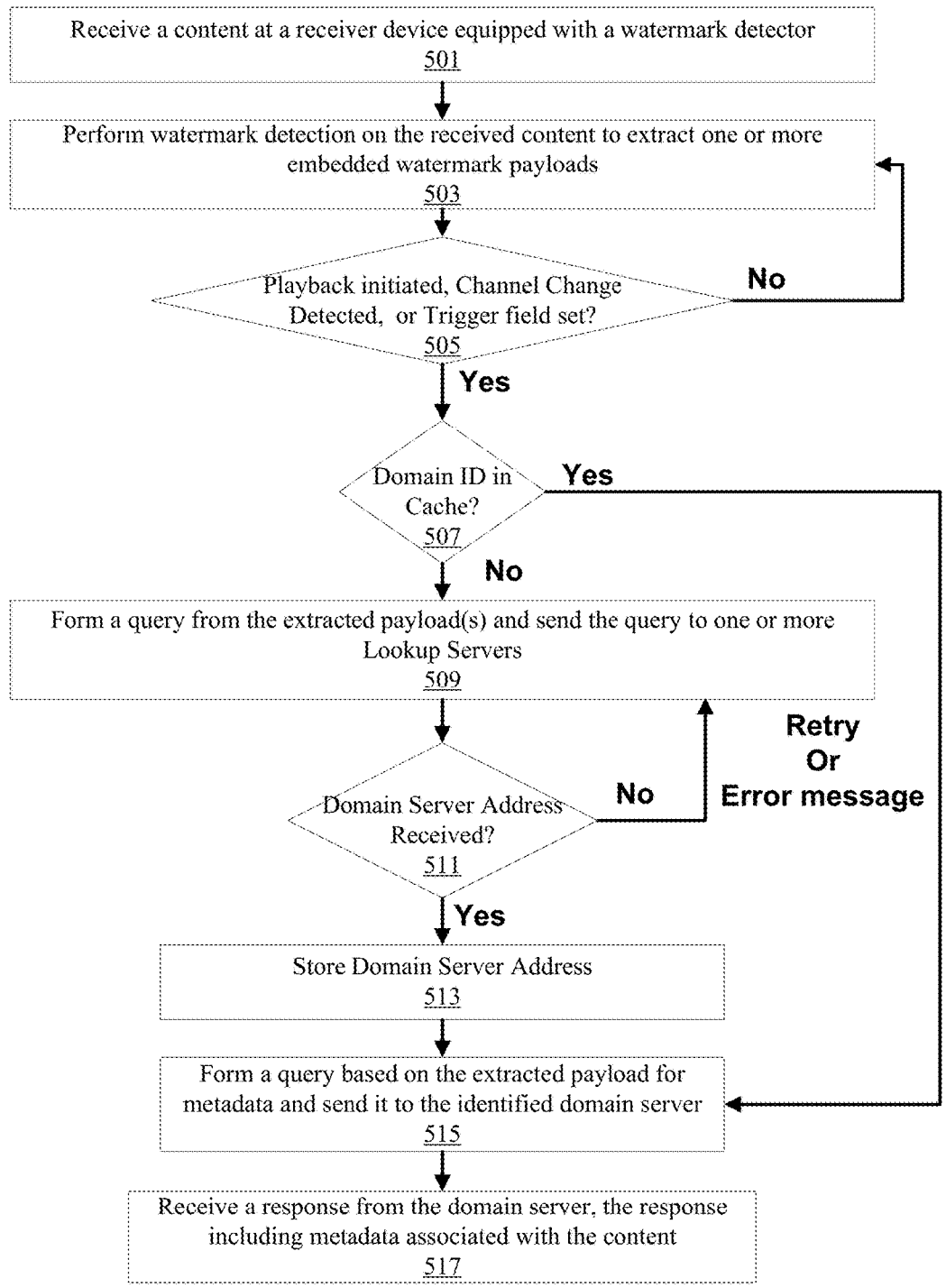
FIG. 5(B) illustrates a set of exemplary operations that can be carried out to provide automatic content recognition and to acquire associated metadata in accordance with an exemplary embodiment.

FIG. 5(B) illustrates a set of exemplary operations that may be carried out to provide automatic content recognition and to acquire associated metadata in accordance with an exemplary embodiment. The operations in FIG. 5(B) are similar to those in FIG. 5(A) but further emphasize the conditions that provide a hint to the receiver to initiate a query to the server. In particular, after receiving a content (at 501) and performing watermark detection (at 503), it is determined at 505 if the playback is initiated, a channel change is detected, or the trigger field is set. For example, such a determination can provide an affirmative answer (YES) if the trigger field (e.g., the trigger bit) is set to "1" or if the trigger field value has changed from a previously detected trigger field value. Such a determination can also provide an affirmative answer (YES), when, for example, the detected watermark is a first one after content playback begins or the first one after a channel change has occurred. If the determination at the 505 is a NO, the operations return to 503, where additional watermarks from the received content are detected. If the determination at 505 results in a YES, the operations continue to 507, where it is determined whether or not the Domain ID corresponding to the detected watermark is stored in cache. The operations 507, 509, 511, 513, 515 and 517 in FIG. 5(B) are similar to the previously described operations 506, 508, 510, 512, 514 and 516 of FIG. 5(A), respectively.

VP1 Watermark:

One specific example implementation of the disclosed technology is fully compatible with requirements set forth in the call for proposals ("CfP") for ATSC-3.0 Automatic Content Recognition Watermarking Solutions. Such an implementation provides a flexible, decentralized and scalable Internet-based system architecture that employs a particular watermark, called VP1, in conjunction with a collection of standardized communication protocols and a lightweight administrative process that enable any connected ATSC Receiver to fully recover ATSC-3.0 broadcast stream metadata which has been lost over interfaces which do not carry the full broadcast stream. Such an architecture supports the server-based usage model outlined in the CfP, but also enables a more open, decentralized, and efficient architecture that obviates receiver manufacturers of the requirement to provide ACR services or contract metadata services, and enables this function to be provided by the same Content and Signaling Servers that support interactive services enabled in ATSC Receivers via direct access to the full ATSC broadcast stream. One function which must be centralized in this architecture, however, is a domain registrar (e.g., a Server Registrar), which runs a lightweight administrative process for assigning blocks of watermark codes to registrants and publishes a database of the registrations to service providers. (This function may be operated by ATSC or an administrative entity designated by it.) All other functions are open and decentralized and can be operated by broadcasters, receiver manufacturers, or third-party service providers. Such an architecture offers significant market and operational benefits by avoiding the need for any service provider to aggregate and publish metadata associated with multiple broadcast streams. Similarly, ATCS receiver manufacturers are not required to engage with a commercial service provider to aggregate and publish metadata associated with all broadcast streams.

The VP1 watermark and the associated system architecture are based upon the use of a 50-bit watermark data payload which has a 1.5 second duration in the marked content. A single detected watermark is sufficient to synchronize the receiver with the timecode of the embedded content with frame (e.g., millisecond) accuracy and recover any lost metadata and interactive services associated with the original broadcast stream. The VP1 watermark may be embedded continuously in content for subsequent detection such that:

(a) The audio quality is "near transparent" (i.e. a difference grade with a 95% confidence lower bound greater than −0.5) under the test conditions of ITU BS-1116-1 "Subjective Assessment of Small Audio Impairments;"

(b) The mean-time-to-first-detection of the payload is less than 3 seconds for broadcast content subjected to HE AAC v2 at 48 kbps;

(c) False detections (i.e., detected reported from unembedded content) and erroneous detections (i.e., detection of data payload different from what is embedded in the content) are reported by the detector with frequency not greater than once per 5 years of continuous detection; note that the data payload obtained in the case of a false or erroneous detection is considered to have a random value uniformly distributed across the range of defined codes. Since many possible code values will not be associated with broadcast content, the frequency of user-facing errors resulting from false or erroneous detections will be substantially less than the above (i.e., will be even further apart than 5 years).

(d) Embedding of the VP1 watermark requires not more than 20 mega instructions per second (MIPS) of processing per 48 kHz audio channel;

(e) Detection of the VP1 watermark requires not more than 10 MIPS of processing per multichannel audio program.

Additionally, VP1 watermark supports overwriting of watermarks and erasure of watermarks to enable any party in the content production or distribution chain to control all downstream watermark functionality. VP1 further supports the carriage of additional orthogonal watermark data channels (often referred to as "layers") containing other data payloads for other applications.

Figure 6:
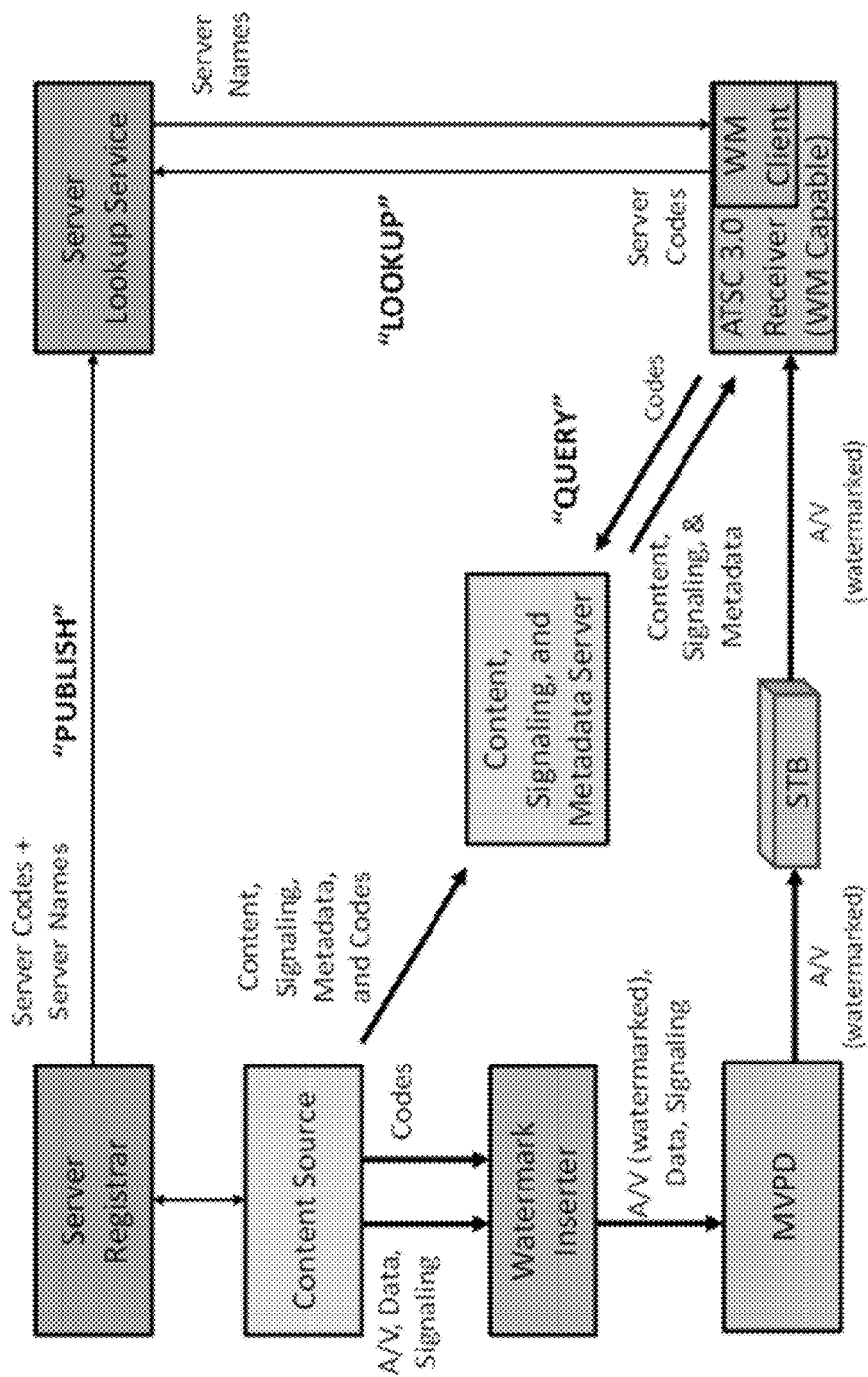
FIG. 6 illustrates a system and associated components that enables automatic content recognition and acquisition of corresponding metadata in accordance with an exemplary embodiment.

The distributed system architecture associated with the VP1 watermark enables not only standardization of the watermark technology, but also includes a standardized code management scheme and three network protocols. An illustration of the architecture, which is compatible with the approach set forth in FIG. 2 of the CfP, is provided in FIG. 6. With reference to FIG. 6, the code management (or domain management) scheme, system component functionality, and necessary protocols are described in the following sections.

Figure 7:
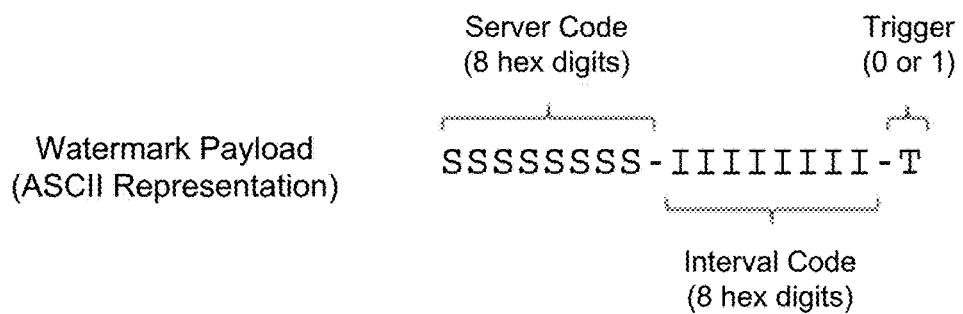
FIG. 7 illustrates a watermark payload structure in accordance with an exemplary embodiment.

Similar to the previously describes watermark payload structure, the VP1 watermark includes a watermark payload with three fields. These fields carry a Server Code, an Interval Code, and a Trigger. It should be noted that the fields of VP1 watermark payload structure conform to the previously described watermark structure, with Sever Code and Interval Code being analogous to the Domain ID and a Sequence ID. An exemplary VP1 watermark structure is shown in FIG. 7. The Server Code is a value which is registered with a central authority designated by a Server Registrar (e.g., ATSC) that provides a mechanism for dividing the watermark code space among independent code-issuing entities (e.g., Server Registrants). For example, a Server Code can be registered by a content producer that wants to manage and use codes within content that they produce, a network that wants to manage and use codes within content that they distribute, or a service provider that wants to manage interactive services on their behalf. These independent code-issuing entities are sometimes referred to as "ATSC Domains" because the Server Code can also provide a one-to-one mapping to an Internet domain. The domain identifiers are recorded by the Server Registrar, are published to Server Lookup Services which maintain copies of the registration database, and can be accessed by receivers to discover the Internet domain name at which they can access servers hosting metadata associated with content embedded with that Server Code.

The Server Registrant is responsible for coordinating the management of all Interval Codes associated with their assigned Server Code. Each Interval Code value can be associated uniquely with a specific interval of an instance of broadcast content. In some implementations, the interval is equal to the watermark duration (e.g., 1.5 seconds) but can be longer in circumstances where there is no need to enable a receiver to identify timing within the interval. We refer to the range of codes defined by an assigned Server Code and all associated Interval Codes as a Code Domain. The Trigger field of the VP1 watermark is a Boolean signal from the Content Source to the ATSC Receiver indicating that the ATSC Receiver should query for new interactive service content.

It should be noted that several components that are shown in FIG. 6 can find analogous counterparts in FIG. 1. For example, the Server Registrar and the Domain Registrar; the Content, Signaling and Metadata Server and Domain Server; and the Server Lookup Service/server and Domain Lookup Server can carry out analogous operations. The various components in FIG. 6 are further described below. A Server Registrar is established by ATSC for the purpose of registering ATSC Domains and assigning to each a unique Server Code. Registrants inform the registrar of a Server Name, which is the Internet domain name or URL at which metadata services associated with the Code Domain are located. The Server Registrar publishes the Server Code and associated Server Name to the Server Lookup Services.

One or more Server Lookup Services are established. These services may be operated by ATSC, the Server Registrar, Content Owners, ATSC Receiver manufacturers, or a third party. Each Server Lookup Service maintains a database of all Server Code/Server Name associations published by the Server Registrar and responds to lookup requests from ATSC Receivers. The Server Lookup Services do not need to access or store any broadcast metadata; they simply provide ATSC Receivers with access to Server Names associated with Server Codes detected from broadcast watermarks.

A Content Source, acting either as a Server Registrant or in concert with a Server Registrant, associates a valid registered Server Code and one or more unique Interval Codes and maps them to intervals of broadcast content essence. The Content Source embeds those codes in the broadcast content using a Watermark Inserter prior to delivery of the broadcast content to an MVPD. The Interval Codes and the metadata for those same intervals of broadcast essence (e.g. any interactive content, signaling, metadata, triggers, channel identifier, media timeline timecode, etc.) are associated together in a database which is provided to a Content, Signaling, and Metadata Server ("CSM Server"). Content Sources may associate and embed watermarks continuously throughout their program material using sequentially increasing Interval Codes, may embed watermarks only in those intervals of content where interactive services are enabled, or may embed an Interval Code repeatedly through a program segment where an interactive service is available but does not require timing precision. Content Sources may register additional Code Domains in advance of depleting the Interval Code space associated with a given Server Code and may associate newly assigned Server Codes with the same Internet domain name to maintain infrastructure continuity.

The CSM Server responds to various requests from ATSC Receivers, including delivery of signaling and interactive content based on interactive service data received from a complete broadcast stream. The CSM Server also responds to code metadata queries, in which a query containing the watermark payload (e.g. in the ASCII representational format) is submitted by the WM Client in an ATSC Receiver, with a request for metadata associated with the interval of broadcast content. The metadata included in the CSM Server response may include channel identifiers, timecodes, content or segment identifiers, triggers, etc.; these are referred to as the "information to convey" in the CfP. It should be noted that while metadata services can be hosted in the same servers as the content and signaling services, they may alternatively be hosted on different servers from those used for content and signaling services.

ATSC Receivers may obtain broadcast content essence absent the full ATSC broadcast stream from an MVPD via a STB. The ATSC receiver may provide the content essence to the watermark client for detection of any embedded codes. As part of watermark client implementation in a given product, associations between Server Codes and Server Names can be stored in a cache (e.g., memory device), but it can also include the Internet address of a Server Lookup Service so that it may lookup newly registered or modified Server Names. The cache may be pre-populated at the time at ATSC Receiver manufacture to reduce traffic to Server Lookup Services.

When the watermark client detects a watermark payload embedded in the content it is playing, it checks to see whether or not the detected Server Code is present in its cache. If it is, the watermark client queries the CSM Server whose Server Name is associated with the Server Code to obtain the metadata associated with the detected watermark payload. If the Server Code from the detected watermark is not present in its cache, or if the contacted server fails to respond as expected, the watermark client may look up the current Server Name associated with the Server Code from the Server Lookup Service, cache the result, and then initiate a query directed at the newly identified Server Name.

Watermark clients may be configured to initiate a query only for certain watermark detections; e.g. the first one after playback begins, the first one after a channel change, only those with the Trigger field set if a query has not been performed within the past, e.g., 30 seconds, etc. Timecode metadata provided to watermark clients by the CSM Server can be used in conjunction with data recovered from the watermark detection process to determine the original media timecode of the broadcast content with frame or millisecond accuracy.

To enable the architecture that is depicted in FIG. 6, open standards can be provided for the following three network protocols: PUBLISH, LOOKUP, and QUERY.

PUBLISH is a protocol whereby the Server Registrar notifies interested ecosystem participants of a newly established or updated mapping between a Server Code and an Internet domain name and publishes the association to Server Lookup Services.

LOOKUP is a protocol whereby an ATSC Receiver can submit a Server Code to a Server Lookup Service and receive a response containing the associated Server Name which has been most recently published by the Server Registrar.

QUERY is a protocol whereby an ATSC Receiver can submit a Server Code and Interval Code to a CSM Server and receive ATSC metadata (e.g. channel, timecode, interactive services triggers, etc.) associated with the specified interval of broadcast content.

The CfP further describes a scenario in its FIG. 2, where the associated architecture relies on having receivers programmed to access a metadata server designated by receiver manufacturer with all of their watermark-related requests. The disclosed architecture of the present application supports the use of this approach by receiver manufacturers who wish to employ such a model. In such an arrangement, (where the italicized terminology is taken from FIG. 2 of the CfP) the code DB and metadata server can be populated by any metadata server operator with access to the full broadcast stream for all broadcasters in a region. The same service provider can perform watermark detection and metadata recovery from the broadcast stream to populate their Code DB for use by the metadata server. Since the watermark specification is open, the Content Source need not use a Watermark Inserter affiliated with any particular metadata server operator and any metadata sever operator can recover the watermarks embedded by any broadcaster.

As a very specific example, the code DB and the Content and Signaling Server can be populated by any automatic content recognition (ACR) service provider with access to the full broadcast stream for all broadcasters in a region. The ACR service provider can perform watermark detection and metadata recovery from the broadcast stream to populate their Code DB for use by the Content and Signaling Server. Since the watermark specification is open, the Content Source need not use a Watermark Inserter affiliated with any particular ACR service provider and any ACR service provider can recover the watermarks embedded by any broadcaster.

ATSC receivers within such a closed ecosystem need not employ the LOOKUP or QUERY protocols and can instead rely on the private protocols for accessing services within this private ecosystem created by the metadata server operator (e.g., by the ACR service provider). Such receivers can seamlessly coexist alongside other ATSC receivers that employ the standardized protocols and infrastructure that is described in the present application.

The following provides a detailed example of a code structure and payload encoding in accordance with certain embodiments of the present application. The representational structure that previously described in connection with FIG. 7, supports a larger space than a 50-bit payload. In the sections that follow, we define a subset of that code space that can be suitably used to provide the needed signaling in more efficient manner; we further describe a proposed approach for encoding into the watermark payload.

FIG. 8(A) illustrates an exemplary watermark structure in accordance with an exemplary embodiment. As illustrated in FIG. 8(A), the 50-bit watermark payload is divided into two top-level fields; the Payload Type field (2 bits) and the Payload Field (48 bits). The Payload Type field describes the format of the Payload Field, with the mapping as shown in FIG. 8(B). The structure of the Large Domain, Medium Domain, and Small Domain fields are as shown in FIG. 8(C). Each of the 48-bit payload fields in FIG. 8(C) includes a Server Field, an Interval Field and a Trigger Field.

The Server Code is related to the Server Field for any of the three domain types by ((PT<<30)+SF), where <<30 is bit-wise left shift by 30 bits, PT is the Payload Type value and SF is the Server Field value. FIG. 8(D) provides a listing of the supported range of Server Codes and the supported range of Interval Codes per Code Domain with this approach. Codes outside of the supported range are considered to be reserved. This arrangement, which supports allocation of Code Domains of varying size, aids in efficient code space usage. The table in FIG. 8(E) summarizes the number of domains of each type that can be allocated with the above approach and the amount of continuously broadcast, uniquely embedded content that each domain type can support (assuming 1 unique code per 1.5 seconds of broadcast content). Server registrants may select the size of domain (small, medium, or large) needed at the time of registration.

Certain aspects of the disclosed embodiments can be implemented as a device that includes a processor, and a memory comprising processor executable code. The processor executable code, when executed by the processor, configures the device to perform any one of and/or all operations that are described in the present application.

Figure 9:
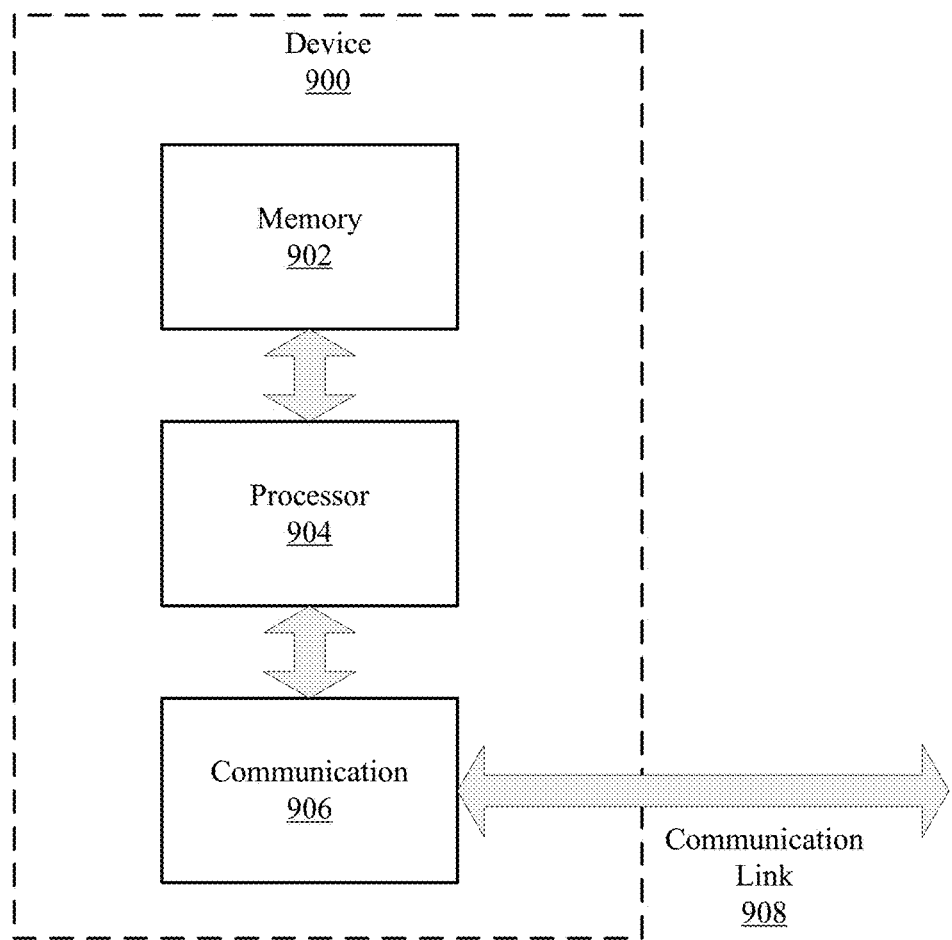
FIG. 9 illustrates a block diagram of a device 900 within which various disclosed embodiments may be implemented.

FIG. 9 illustrates a block diagram of a device 900 within which various disclosed embodiments may be implemented. The device of FIG. 9 can be implemented as part of any one of: the Receiver device, the set-top box, the Domain Member, the Domain Registrant or the Domain Registrar that are depicted in FIG. 1. The device 900 comprises at least one processor 904 and/or controller, at least one memory 902 unit that is in communication with the processor 904, and at least one communication unit 906 that enables the exchange of data and information, directly or indirectly, through the communication link 908 with other entities, devices, databases and networks. The communication unit 906 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 900 of FIG. 9 may be integrated as part of any devices or components shown in FIG. 1 to perform any of the disclosed methods.

Figure 10:
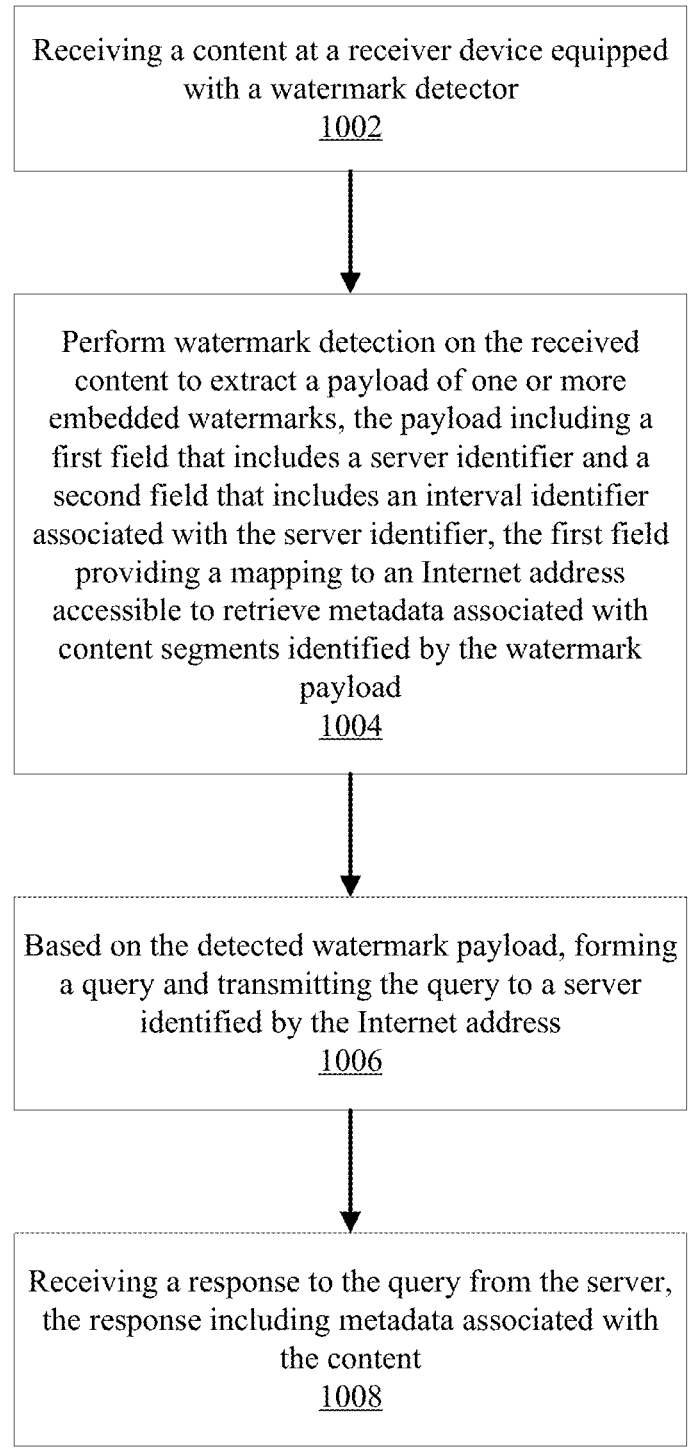
FIG. 10 illustrates a set of exemplary operations that may be carried out in accordance with an exemplary embodiment to obtain metadata associated with a multimedia content.

FIG. 10 illustrates a set of exemplary operations that may be carried out in accordance with an exemplary embodiment to obtain metadata associated with a multimedia content. At 1002, a content is received at a receiver device equipped with a watermark detector. The received content can, for example, consist of a portion or a components (e.g., an audio or video component) of the multimedia content. At 1004, watermark detection is performed on the received content to extract a payload of one or more embedded watermarks. The payload includes a first field that includes a server identifier and a second field that includes an interval identifier associated with the server identifier. The first field provides a mapping to an Internet address accessible to retrieve metadata associated with content segments identified by the watermark payload. At 1006, a query is formed based on the detected watermark payload, and the query is transmitted to a server identified by the Internet address. At 1008, a response to the query is received from the server. The response includes metadata associated with the content.

One aspect of the disclosed embodiments relates to a system that includes a domain lookup server and a registrant server. The domain lookup server is configured to receive a lookup request from a receiver, where the request comprises a server code obtained from watermarks extracted from a multimedia content. The domain lookup server can receive a server name associated with the server code from a registrar server, and to further provide a response for transmission to the receiver. The domain lookup server's response includes the server name. The system's registrant server includes or is in communication with a metadata server that is populated with at least metadata associated with the multimedia content, and a processor implemented using electronic circuitry to receive, from the registrar server, the server code assigned to the registrant server, to assign one or more interval codes corresponding to one or more segments of the multimedia content, and to communicate information comprising each assigned interval code and associated metadata to the metadata server.

In one exemplary embodiment, the above system further includes a watermark inserter coupled to the registrant server. The watermark inserter is configured to receive the sever code, and the one or more interval codes the multimedia content, and to embed the server code and the one or more interval codes as watermarks into the multimedia content. In another exemplary embodiment, the system also is in communication with a content broadcaster that is coupled to the watermark inserter. The content broadcaster can receive the embedded multimedia content and can transmit the embedded multimedia content to the receiver. In some implementations, the system also includes the receiver, and a set-top-box (STB) coupled to the receiver. The STB is configured to receive the embedded multimedia content from the content broadcaster and to provide at least one component of the received embedded multimedia content to the receiver. In some exemplary implementations, the at least one component is an audio component of the multimedia content.

According to one exemplary embodiment, the above system further includes one or more additional content registrant servers, where each of the one or more additional registrant servers is coupled to the registrar server and to the metadata server. Each registrant server includes a corresponding processor implemented using electronic circuitry to receive, from the registrar server, a unique server code assigned to the corresponding registrant server. Further, each registrant server can assign one or more interval codes associated with the registrant server's unique server code and corresponding to one or more segments of the multimedia content. Each registrant server can further communicate information comprising the registrant server's assigned interval code(s) and associated metadata to the metadata server. In one exemplary implementation, the watermark inserter is coupled to at least one of the additional registrant servers to receive the server code and interval codes corresponding to the at least one of the additional registrant servers, and to embed the server code and interval codes corresponding to the at least one of the additional registrant servers as watermarks into the multimedia content.

In another exemplary embodiment, the watermark inserter is configured to insert the server code and interval codes corresponding to the at least one of the additional registrant servers as a different watermark layers into the multimedia content than the server code and interval codes of another registrant server. In yet another exemplary embodiment, the receiver is configured to detect the embedded watermarks from at least two watermarking layers to obtain at least two unique server codes, and to further transmit one or both of the unique server codes to the lookup server, and, in response, to receive, from the domain lookup server, server names associated with one or both of the unique server codes.

The components or modules that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products, as well as in different sequential orders. Any embodiment may further be combined with any other embodiment.

What is claimed is:

1. A method for embedding a watermark message in a content for facilitating acquisition of associated information, the method comprising:
    obtaining a server code for embedding into a content, the server code identifying a particular domain name that is registered to a registrant entity and providing a mapping to an Internet address of a metadata server that includes information associated with the content;
    receiving an indication that a trigger event is associated with a particular segment of the content;
    forming a first watermark payload comprising the server code, an interval code and a first trigger value, wherein the interval code identifies the particular segment of the content and the first trigger value is utilized to indicate that additional information associated with the particular segment is available upon transmission of a query to a metadata server; and
    embedding, using a watermark embedder that is implemented at least partially in hardware, the first watermark payload that includes the server code, the interval code and the trigger value into the content, wherein detection of the first trigger value from a subsequently distributed content that includes the first watermark payload having the first trigger value enables a query to the metadata server that is based on the server code and the interval code for acquisition of metadata associated with the particular segment identified by the interval code.

2. The method of claim 1, wherein the content includes additional watermark payloads that exclude the first trigger value.

3. The method of claim 1, further comprising:
    embedding a second watermark payload that includes a second trigger value different from the first trigger value, wherein the second trigger value provides an indication that a query to the metadata server should not be initiated.

4. The method of claim 1, further comprising:
    embedding a second watermark payload that includes a second trigger value different from the first trigger value, wherein detection of a change from the second trigger value to the first trigger value provides an indication that additional information associated with the particular segment is available upon transmission of the query to the metadata server.

5. The method of claim 4, wherein the second watermark payload is embedded in a content segment that occurs at an earlier instant in time on a the content's timeline compared to the particular content segment that includes the first watermark payload.

6. The method of claim 1, wherein the first trigger value enables retrieval of one or more of the following items:
    an interactive content,
    a broadcast channel identifier,
    a timecode,
    an additional trigger event,
    an advertisement, or
    a server location.

7. The method of claim 1, wherein the additional information associated with the particular segment includes instructions to load or execute an additional content or service that is associated with the particular segment.

8. The method of claim 1, wherein the first trigger value is a binary value.

9. The method of claim 1, wherein the first trigger value is indicative that only upon detection of the first trigger value a query to the metadata server should be initiated.

10. The method of claim 1, wherein the first trigger value is part of a trigger field within the first payload, wherein an absence of a trigger field is any embedded watermark is indicative that a query to the metadata server should not be initiated.

11. The method of claim 1, further including embedding additional watermarks in the content that exclude a trigger value as part of payloads of the additional watermarks.

12. The method of claim 1, further comprising distributing the content subsequent to embedding of the first watermark payload.

13. The method of claim 12, further comprising receiving the content at a receiver device subsequent to distributing the content, and extracting the first watermark payload by a watermark extractor of the receiver device, wherein the watermark extractor is implemented at least partially in hardware.

14. The method of claim 1, further comprising transmitting information including the server code, the interval code and the first trigger value associated with the content for storage at the metadata server.

15. The method of claim 1, wherein the first watermark payload includes a first trigger field that includes the first trigger value and includes a second trigger field that is used to indicate whether or not a preexisting watermark message within the content can be overwritten by a new watermark message.

16. The method of claim 1, wherein the first watermark payload includes a first trigger field that includes the first trigger value and includes a second trigger field that is used to indicate whether or not a new watermark message having a new payload can be embedded into the content and coexist with a preexisting watermark message within the content.

17. A device, comprising:
    a processor; and
    a memory including processor executable instructions stored thereon, wherein the processor executable instructions upon execution by the processor causes the device to:
        obtain a server code for embedding into a content, the server code identifying a particular domain name that is registered to a registrant entity and providing a mapping to an Internet address of a metadata server that includes information associated with the content;
        receive an indication that a trigger event is associated with a particular segment of the content;
        form a first watermark payload comprising the server code, an interval code and a first trigger value, wherein the interval code identifying the particular segment of the content and the first trigger value is utilized to indicate that additional information associated with the particular segment is available upon transmission of a query to a metadata server; and embed the first watermark payload that includes the server code, the interval code and the first trigger value into the content, wherein detection of the first trigger value from a subsequently distributed content that includes the first watermark payload having the first trigger value enables a query to the metadata server that is based on the server code and the interval code for acquisition of metadata associated with the particular segment identified by the interval code.

18. The device of claim 17, wherein the content includes additional watermark payloads that exclude the first trigger value.

19. The device of claim 17, wherein the processor executable instructions upon execution by the processor further causes the device to:

embed a second watermark payload that includes a second trigger value different from the first trigger value, wherein the second trigger value provides an indication that a query to the metadata server should not be initiated.

20. The device of claim 17, wherein the processor executable instructions upon execution by the processor further causes the device to:

embed a second watermark payload that includes a second trigger value different from the first trigger value, wherein detection of a change from the second trigger value to the first trigger value provides an indication that additional information associated with the particular segment is available upon transmission of the query to the metadata server.

21. The device of claim 20, wherein the second watermark payload is embedded in a content segment that occurs at an earlier instant in time on a the content's timeline compared to the particular content segment that includes the first watermark payload.

22. The device of claim 17, wherein the first trigger value enables retrieval of one or more of the following items:
an interactive content,
a broadcast channel identifier,
a timecode,
an additional trigger event,
an advertisement, or
a server location.

23. The device of claim 17, wherein the additional information associated with the particular segment includes instructions to load or execute an additional content or service that is associated with the particular segment.

24. The device of claim 17, wherein the first trigger value is a binary value.

25. The device of claim 17, wherein the first trigger value is indicative that only upon detection of the first trigger value a query to the metadata server should be initiated.

26. The device of claim 17, wherein the first trigger value is part of a trigger field within the first payload, wherein an absence of a trigger field is any embedded watermark is indicative that a query to the metadata server should not be initiated.

27. The device of claim 17, wherein the processor executable instructions upon execution by the processor further causes the device to embed additional watermarks in the content that exclude a trigger value as part of payloads of the additional watermarks.

28. The device of claim 17, wherein the processor executable instructions upon execution by the processor further causes the device to transmit the content subsequent to embedding of the first watermark payload for distribution to other devices.

29. The device of claim 17, wherein the processor executable instructions upon execution by the processor further causes the device to transmit information including the server code, the interval code and the trigger value associated with the content to the metadata server.

30. The device of claim 17, wherein the first watermark payload includes a first trigger field that includes the first trigger value and includes a second trigger field that is used to indicate whether or not a preexisting watermark message within the content can be overwritten by a new watermark message.

31. The device of claim 17, wherein the first watermark payload includes a first trigger field that includes the first trigger value and includes a second trigger field that is used to indicate whether or not a new watermark message having a new payload can be embedded into the content and coexist with a preexisting watermark message within the content.

32. A computer program product, embodied on a non-transitory computer readable medium, comprising:

program code for obtaining a server code for embedding into a content, the server code identifying a particular domain name that is registered to a registrant entity and providing a mapping to an Internet address of a metadata server that includes information associated with the content;

program code for receiving an indication that a trigger event is associated with a particular segment of the content;

program code for forming a first watermark payload comprising the server code, an interval code and a first trigger value, wherein the interval code identifies the particular segment of the content and the trigger value is utilized to indicate that additional information associated with the particular segment is available upon transmission of a query to a metadata server; and program code for embedding the first watermark payload that includes the server code, the interval code and the trigger value into the content, wherein detection of the first trigger value from a subsequently distributed content that includes the first watermark payload having the first trigger value enables a query to the metadata server that is based on the server code and the interval code for acquisition of metadata associated with the particular segment identified by the interval code.

* * * * *